US012549687B1

(12) United States Patent
Bentley et al.

(10) Patent No.: US 12,549,687 B1
(45) Date of Patent: Feb. 10, 2026

(54) METHODS AND SYSTEMS IMPROVING NETWORK PERFORMANCE FOR VIDEO SURVEILLANCE

(71) Applicant: Cloudastructure, Inc., Miami, FL (US)

(72) Inventors: Sheldon Richard Bentley, Truckee, CA (US); Bruce E. Durham, Pescadero, CA (US); Gregory M. Rayzman, Palo Alto, CA (US)

(73) Assignee: Cloudastructure, Inc., Miami, FL (US)

( * ) Notice: Subject to any disclaimer, the term of this patent is extended or adjusted under 35 U.S.C. 154(b) by 259 days.

(21) Appl. No.: 18/133,167

(22) Filed: Apr. 11, 2023

Related U.S. Application Data

(60) Provisional application No. 63/329,764, filed on Apr. 11, 2022.

(51) Int. Cl.
| | | |
|---|---|---|
| *H04N 19/82* | (2014.01) | |
| *G06V 10/82* | (2022.01) | |
| *G06V 10/94* | (2022.01) | |
| *G06V 20/40* | (2022.01) | |
| *H04N 5/77* | (2006.01) | |
| *H04N 7/18* | (2006.01) | |

(52) U.S. Cl.
CPC ............. *H04N 7/181* (2013.01); *G06V 10/82* (2022.01); *G06V 10/945* (2022.01); *G06V 20/41* (2022.01); *H04N 5/77* (2013.01)

(58) Field of Classification Search
CPC .......... H04N 7/181; H04N 5/77; G06V 10/82; G06V 20/41; G06V 10/945
See application file for complete search history.

(56) References Cited

U.S. PATENT DOCUMENTS

| | | | |
|---|---|---|---|
| 6,698,021 | B1 | 2/2004 | Amini et al. |
| 6,718,388 | B1 | 4/2004 | Yarborough et al. |
| 7,015,806 | B2 | 3/2006 | Naidoo et al. |
| 7,385,626 | B2 | 6/2008 | Aggarwal et al. |
| 7,623,152 | B1 | 11/2009 | Kaplinsky |
| 10,373,458 | B2 | 8/2019 | Selinger et al. |
| 10,386,999 | B2 | 8/2019 | Burns et al. |
| 10,424,341 | B2 | 9/2019 | Thornton et al. |
| 10,645,344 | B2 | 5/2020 | Marman et al. |
| 10,701,321 | B2 | 6/2020 | Westmacott et al. |
| 10,805,535 | B2 | 10/2020 | Dal Mutto et al. |
| 11,836,160 | B1 * | 12/2023 | Xia ..................... G06N 20/00 |
| 2002/0004838 | A1 | 1/2002 | Hakenberg et al. |

(Continued)

FOREIGN PATENT DOCUMENTS

KR          20190035168 A      4/2019

OTHER PUBLICATIONS

U.S. Appl. No. 18/298,887 Office Action dated May 16, 2025.

*Primary Examiner* — Patrick E Demosky
(74) *Attorney, Agent, or Firm* — Wilson Sonsini Goodrich & Rosati

(57) ABSTRACT

Disclosed are platforms, systems, methods, and media for performing networked video surveillance while preserving network bandwidth and performance by utilizing at least one video camera deployed on a quarantined sub-network, a local video recorder applying an edge computer vision algorithm to detect an area of an object above a threshold area, and one or more back-end applications applying one or more multi-stage hierarchical computer vision models to the uploaded recorded video to tag video with one or more identified classes of objects.

32 Claims, 12 Drawing Sheets

(56) References Cited

U.S. PATENT DOCUMENTS

| | | |
|---|---|---|
| 2003/0025599 A1 | 2/2003 | Monroe |
| 2003/0062997 A1 | 4/2003 | Naidoo et al. |
| 2004/0109061 A1 | 6/2004 | Walker et al. |
| 2004/0233282 A1 | 11/2004 | Stavely et al. |
| 2005/0007964 A1 | 1/2005 | Falco et al. |
| 2005/0050043 A1 | 3/2005 | Pyhalammi et al. |
| 2005/0075551 A1 | 4/2005 | Horn et al. |
| 2005/0132414 A1 | 6/2005 | Bentley et al. |
| 2006/0248162 A1 | 11/2006 | Kawasaki |
| 2007/0097460 A1 | 5/2007 | Kawai |
| 2007/0273762 A1 | 11/2007 | Steensma et al. |
| 2007/0279222 A1 | 12/2007 | Carrigan |
| 2008/0303903 A1 | 12/2008 | Bentley et al. |
| 2009/0028528 A1 | 1/2009 | Harradine et al. |
| 2009/0070444 A1 | 3/2009 | Fujino et al. |
| 2011/0043631 A1 | 2/2011 | Marman et al. |
| 2016/0133297 A1 | 5/2016 | Thornton et al. |
| 2020/0005116 A1 | 1/2020 | Kuo |
| 2020/0082851 A1 | 3/2020 | Chau et al. |
| 2020/0226416 A1 | 7/2020 | Bapat et al. |
| 2021/0263962 A1* | 8/2021 | Chang .................... G06T 11/60 |

* cited by examiner

| Status | CVR | Pending Metadata Upload | Pending Video Upload | Last Updated |
|---|---|---|---|---|
| ✓ | San Mateo, CA (herostack vm1 :77) | 0 | 0 | Jul 19, 2021 1:15 PM |
| ✓ | Truckee, CA #1 (eaglesnest :28) | 0 | 3 | Jul 19, 2021 1:15 PM |
| ✓ | Truckee, CA #2 (eaglesnest :8c) | 0 | 3 | Jul 19, 2021 1:12 PM |
| ✓ | Truckee, CA (soaringstack vm1 :8c) | 0 | 0 | Jul 19, 2021 1:15 PM |

METHODS AND SYSTEMS IMPROVING NETWORK PERFORMANCE FOR VIDEO SURVEILLANCE

CROSS-REFERENCE

This application claims the benefit of U.S. Provisional Application No. 63/329,764, Apr. 11, 2022, which is hereby incorporated by reference in its entirety herein.

BACKGROUND

Existing video surveillance systems can be expensive, often requiring remote servers to process the captured images, onsite systems uploading videos and human intervention to detect advert events. For example, in a typical object detection application, an object such a moving person is detected in an image by first classifying various image patches across a variety of image scales and then performing an object classification procedure. However, a great computational cost may be incurred to allow a system to robustly determine if an object in an image is valid and needs to be classified or provide motion analysis of large volume of videos.

SUMMARY

With surveillance cameras being produced and sold all over the world, the unregulated security protocols of such devices pose a significant weakness. Such untrusted cameras, if hacked, pose a greater security risk than potential benefit.

The use of raw video data for surveillance requires excessive data storage and transmission bandwidth. While some existing video surveillance systems reduce the size of the raw video through image analysis, such systems either provide security personnel with too much footage to review and process, and/or insufficiently reduce the data size of the videos.

In one aspect, disclosed herein are networked video surveillance platforms comprising: at least one video camera; a local video recorder; and one or more back-end applications; the at least one video camera deployed at the user site on a quarantined sub-network and configured to provide a video stream directly to the local video recorder; the local video recorder deployed at the user site, comprising a memory, and configured to perform operations comprising: provide the video stream to the one or more back-end applications as a continuous live stream upon request generated at the interface; apply an edge computer vision algorithm to detect an object in the video stream and determine an area of the object; and if the edge computer vision algorithm detects and determines the area of the object above a threshold area, record the video stream to the memory and upload the recorded video to the one or more back-end applications; the one or more back-end applications running remotely from the user site, in communication with the local video recorder by a secure network connection, and configured to perform operations comprising: maintain a data store comprising a plurality of multi-stage hierarchical computer vision models, each configured for identification of a class of objects; apply one or more of the multi-stage hierarchical computer vision models to the uploaded recorded video to tag the video with one or more identified classes of objects; and provide an interface configured to: allow the user to request the continuous live stream from the local video recorder; and allow the user to view uploaded recorded videos and sort or filter the video by one or more tags corresponding to identified classes of objects. In some embodiments, the quarantined sub-network prevents the at least one camera from allowing inbound connections, apart from receiving requests from the local video recorder for the video stream, and outbound connections, apart from providing the video stream to the local video recorder. In some embodiments, the at least one camera comprises a memory configured to store a recording of the video stream. In some embodiments, the at least one camera is configured to time-shift the provision of the recorded video to the local video recorder to improve network performance. In various embodiments, the at least one video camera comprises at least 5, at least 10, at least 50, at least 100 video cameras, or more, including increments therein. In some embodiments, the local video recorder is configured to time-shift the upload of the recorded video to the one or more back-end applications to improve network performance. In some embodiments, the one or more back-end applications comprises a cloud application running on a cloud computing infrastructure. In some embodiments, one or more of the plurality of multi-stage hierarchical computer vision models utilizes a neural network. In some embodiments, the neural network comprises a convolutional neural network. In some embodiments, one or more of the plurality of multi-stage hierarchical computer vision models comprises a R-CNN model or a YOLO model. In some embodiments, one or more of the plurality of multi-stage hierarchical computer vision models comprises a branching algorithm. In some embodiments, one or more of the plurality of multi-stage hierarchical computer vision models performs operations comprising: analyzing an uploaded recorded video to identify a first class of object; if the first class of object is identified, analyzing the uploaded recorded video to identify a first sub-class of object; and if the first sub-class of object is identified, analyzing the uploaded recorded video to identify a second sub-class of object. In some embodiments, the secure network connection prevents the one or more back-end applications from allowing inbound connections, apart from receiving user requests from the interface and recorded video uploads from the local video recorder. In some embodiments, the local video recorder is further configured to apply one or more of the multi-stage hierarchical computer vision models to the video stream to tag the video with one or more identified classes of objects. In some embodiments, the video stream is stored in the memory of the local video recorder as a plurality of discrete files. In various embodiments, each discrete file includes about 5, about 10, about 15, or about 20 seconds of video.

In another aspect, disclosed herein are methods for performing networked video surveillance comprising: receiving, at a local video recorder deployed at a user site, a video stream generated by at least one video camera deployed at the user site on a quarantined sub-network; providing, by the local video recorder, the video stream to one or more back-end applications as a continuous live stream in response to a request generated at an interface; applying, by the local video recorder, an edge computer vision algorithm to detect an object in the video stream and determine an area of the object; if the edge computer vision algorithm detects and determines an area of the object above a threshold area: recording the video stream to a memory of the local video recorder, and uploading the recorded video to the one or more back-end applications; maintaining, by one or more back-end applications implemented remotely from the user site and in communication with the local video recorder by a secure network connection, a data store comprising a plurality of multi-stage hierarchical computer vision models, each configured for identification of a class of objects; applying, by the one or more back-end applications, one or more of the multi-stage hierarchical computer vision models to the uploaded recorded video to tag the video with one or more identified classes of objects; and providing, by the one or more back-end applications, an interface configured to: allow a user to request a continuous live stream from the local video recorder, and allow the user to view uploaded recorded video and sort or filter the video by one or more tags corresponding to identified classes of objects. In some embodiments, the quarantined sub-network prevents the at least one video camera from allowing inbound connections, apart from receiving requests from the local video recorder for the video stream, and making outbound connections, apart from providing the video stream to the local video recorder. In some embodiments, the method comprises time-shifting, by the local video recorder, the upload of the recorded video to one or more of the back-end applications to improve network performance. In some embodiments, the at least one video camera comprises a memory configured to store a recording of the video stream. In further embodiments, the method comprises time-shifting, by the at least one video camera, the provision of the recorded video to the local video recorder to improve network performance. In various embodiments, the at least one video camera comprises at least 5, at least 10, at least 50, or at least 100 video cameras. In some embodiments, the one or more back-end applications comprises a cloud application running on a cloud computing infrastructure. In some embodiments, one or more of the plurality of multi-stage hierarchical computer vision models utilizes a neural network. In further embodiments, the neural network comprises a convolutional neural network. In some embodiments, one or more of the plurality of multi-stage hierarchical computer vision models comprises a R-CNN model or a YOLO model. In some embodiments, one or more of the plurality of multi-stage hierarchical computer vision models comprises a branching algorithm. In some embodiments, applying the one or more of the multi-stage hierarchical computer vision models further comprises: analyzing an uploaded recorded video to identify a first class of object; if the first class of object is identified, analyzing the uploaded recorded video to identify a first sub-class of object; and if the first sub-class of object is identified, analyzing the uploaded recorded video to identify a second sub-class of object. In some embodiments, the secure network connection prevents the one or more back-end applications from allowing inbound connections, apart from receiving user requests from the interface and recorded video uploads from the local video recorder. In some embodiments, the method comprises applying, by the local video recorder, one or more of the multi-stage hierarchical computer vision models to the video stream to tag the video with one or more identified classes of objects. In some embodiments, the video stream is stored in the memory of the local video recorder as a plurality of discrete files. In various embodiments, each discrete file includes about 5, about 10, about 15, or about 20 seconds of video.

BRIEF DESCRIPTION OF THE DRAWINGS

A better understanding of the features and advantages of the present subject matter will be obtained by reference to the following detailed description that sets forth illustrative embodiments and the accompanying drawings of which:

FIGS. 3 and 4 show an example of a graphical user interface (GUI) of a dashboard, in accordance with some embodiments of the present disclosure;

DETAILED DESCRIPTION

Networked Video Surveillance Platform

In one aspect, disclosed herein is a networked video surveillance platform. In some embodiments, the platform comprises at least one video camera; a local video recorder; and one or more back-end applications. In some embodiments, the at least one video camera is configured to provide a video stream directly to the local video recorder. In some embodiments, the local video recorder is deployed at the user site. In some embodiments, the local video recorder is configured to perform operations comprising: provide the video stream to the one or more back-end applications as a continuous live stream upon request generated at the interface; apply an edge computer vision algorithm to detect an object in the video stream and determine an area of the object; and if the edge computer vision algorithm detects and determines the area of the object above a threshold area, record the video stream to the memory and upload the recorded video to the one or more back-end applications. In some embodiments, the interface is configured to: allow the user to request the continuous live stream from the local video recorder; and allow the user to view uploaded recorded videos and sort or filter the video by one or more tags corresponding to identified classes of objects.

Figure 1:
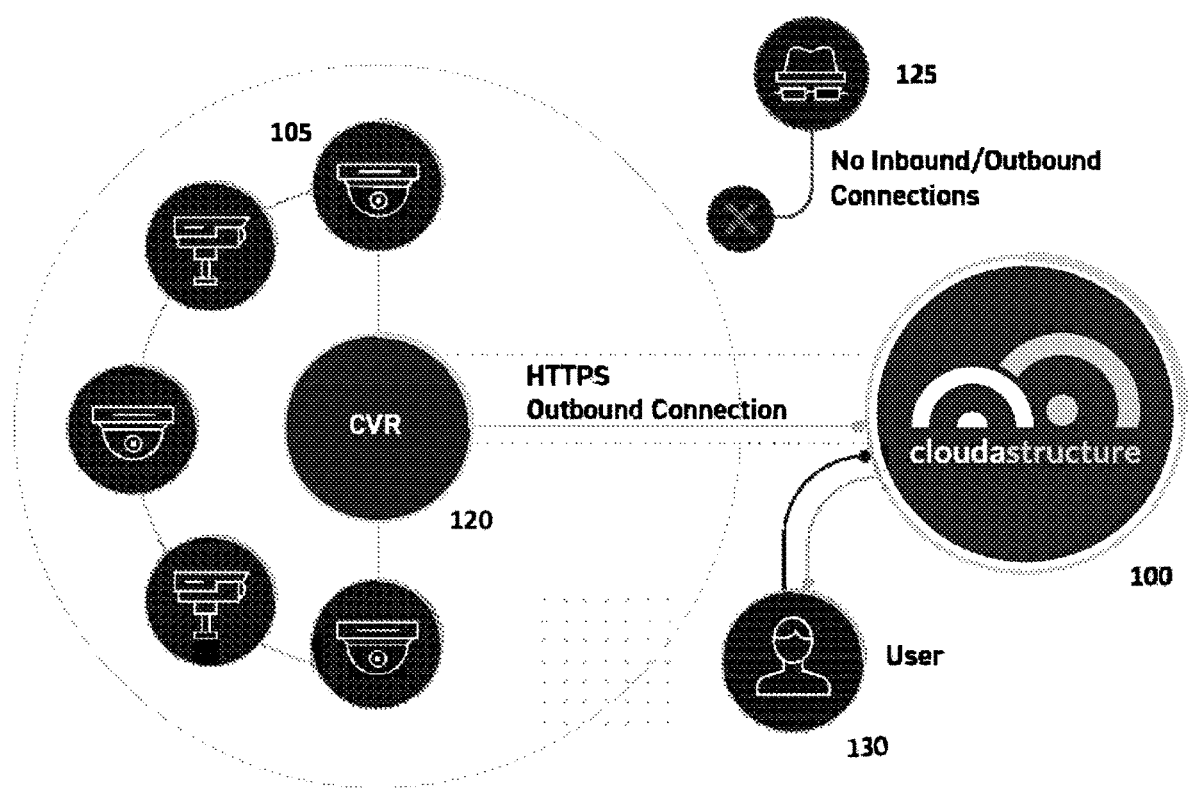
FIG. 1 schematically illustrates a video surveillance platform, in accordance with some embodiments of the present disclosure.

FIG. 1 shows an example of a network of cameras with improved security. The cloud or backend applications may allow users 130 to control or access live views of the trusted cameras 105 in the network. The imaging system 110 may include a network of cameras 105 deployed at an environment.

The video surveillance system may employ an edge intelligence paradigm that data processing and inference is performed at the edge or edge computing unit (e.g., on-site server, Cloud Video Recorder (CVR) 120) while the predictive models may be built, developed, and trained on a cloud/data center 100, and run on the edge computing unit or local video recorder (e.g., CVR 120) for inference. The on-site computing unit may implement a local video recorder (e.g., CVR 120) that is configured to request a video stream from at least one video camera; provide the video stream to one or more back-end applications running on the cloud/data center 100 as a continuous live stream upon request generated at the interface; apply an edge computer vision algorithm to detect an object in the video stream and determine an area of the object; and if the edge computer vision algorithm detects and determines the area of the object above a threshold area, record the video stream to the memory and upload the recorded video to the one or more back-end applications.

In some embodiments, the CVR may employ a data transmission scheme to transmit the videos upon detecting an area of objects in the video. The data transmission scheme may specify how data are transmitted. For instance, the data transmission scheme may specify compression methods (e.g., lossless compression algorithm, lossy compression algorithms, encoding, etc), or encryption methods (e.g., RSA, triple DES, Blowfish, Twofish, AES, etc) used for transmission.

As described above, the edge component 120 may be in communication with an imaging system 110 or one or more image sensors (e.g., visible light, infrared). The edge computing component 120 may be local to the imaging system 110.

Systems and methods of the disclosure may provide an efficient and highly scalable edge data orchestration platform that enables real-time, on-site video surveillance orchestration. In some cases, data managed or transmitted to the on-site edge computing component or local video recorder 120 may include, for example, data streams from the video camera or imaging systems/components.

In some cases, data transmitted to the edge computing server from the cloud or backend systems/components 100 may include control signals or instructions to adjust one or more parameters of the computer vision component or imaging devices and/or instructions related to image processing performed by the imaging devices.

Quarantined Sub-Network

In some embodiments, the at least one video camera is deployed at the user site on a quarantined sub-network. In some embodiments, the quarantined sub-network prevents the at least one camera from allowing inbound connections, apart from receiving requests from the local video recorder for the video stream, and outbound connections, apart from providing the video stream to the local video recorder. The network may provide a quarantined network architecture 215 such that no camera can pass data or receive any commands from outside the network.

Figure 2:
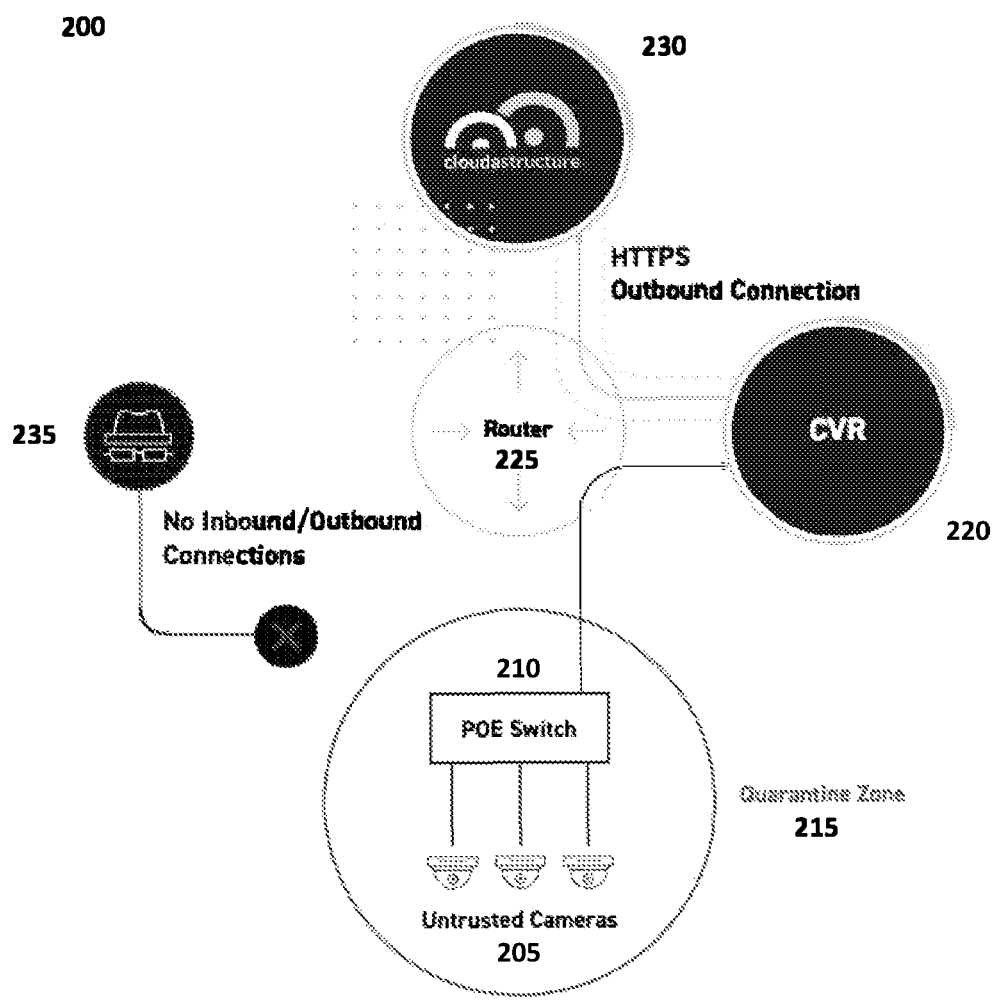
FIG. 2 schematically illustrates a video surveillance platform, in accordance with some embodiments of the present disclosure.

As shown in FIG. 2, the network of cameras 215 may include one or more untrusted cameras 210 that may live on the local area network (LAN). The platform may prevent malicious actor 235 accessing the cameras 205 as the untrusted cameras 205 are disconnected from the Internet 230 via a router 225, a network switches 210, or both. The untrusted cameras may not be given any access to the wwide-area network such as Internet 230 by restricting the routing rules. The untrusted cameras may be restricted from receiving inbound connections or making any outbound connections to the Internet 230. The untrusted cameras may be permitted to serve video directly to the local edge component e.g., Cloud Video Recorder (CVR) 220. The CVR may request video streams from the one or more untrusted cameras (e.g., for recording, for Live View, etc.). The request may be on-demand basis or according to predetermined schedule. The cloud 200 may receive video uploads only from the CVR without direct communication with the one or more untrusted cameras. In some embodiments, the one or more untrusted cameras 210 are cameras manufactured, distributed, or sold by a foreign entity.

Cameras and Imaging Systems

In some embodiments, the at least one camera comprises a memory configured to store a recording of the video stream. In some embodiments, the at least one camera is configured to time-shift the provision of the recorded video to the local video recorder to improve network performance. In some embodiments, the at least one video camera comprises at least 5, at least 10, at least 50, or at least 100 video cameras. In some embodiments, the local video recorder is configured to time-shift the upload of the recorded video to the one or more back-end applications to improve network performance.

In some cases, the camera may be a video camera. The camera may comprise optical elements and image sensor for capturing image data. The image sensors may be configured to generate image data in response to wavelengths of light. A variety of image sensors may be employed for capturing image data such as complementary metal oxide semiconductor (CMOS) or charge-coupled device (CCD). In some cases, the image sensor may be provided on a circuit board. The circuit board may be an imaging printed circuit board (PCB). The PCB may comprise a plurality of electronic elements for processing the image signal. For instance, the circuit for a CMOS sensor may comprise A/D converters and amplifiers to amplify and convert the analog signal provided by the CMOS sensor. Optionally, the image sensor may be integrated with amplifiers and converters to convert analog signal to digital signal such that a circuit board may not be required. In some cases, the output of the image sensor or the circuit board may be image data (digital signals) that can be further processed by a camera circuit or processors of the camera. In some cases, the image sensor may comprise an array of optical sensors. In some cases, the camera may be a plenoptic camera having a main lens and additional micro lens array (MLA). The plenoptic camera model may be used to calculate a depth map of the captured image data. In some cases, the image data captured by the camera may be grayscale image with depth information at each pixel coordinate (i.e., depth map). The camera may be calibrated such that intrinsic camera parameters such as focal length, focus distance, distance between the MLA and image sensor, pixel size and the like are obtained for improving the depth measurement accuracy. Other parameters such as distortion coefficients may also be calibrated to rectify the image for metric depth measurement.

In some cases, the imaging system may comprise one or more sensors that can be used to perform thermal imaging. The sensors may be passive sensors. The sensors may be able to detect heat signatures of humans and/or animals, presence and state of vehicle engines, fire, overheating of installations (such as transformers, wires, pipes, and/or machines).

In some cases, the imaging system may comprise an infrared (IR) camera to perform IR imaging. IR cameras may be able to perform detection of heat emitting objects, such as human objects. Any IR camera known or later developed in the art may be used. In some instances, active illumination may be employed. The platform may be able to generate a thermal image in complete darkness from an IR camera. IR images may be used in conjunction with or instead of visible spectra images. Any functions provided elsewhere herein using cameras may also apply to IR cameras. The IR imaging may be used for motion detection, facial recognition (e.g., unique identification), demographics recognition (e.g., gender, age, race, etc.), state recognition (e.g., emotional state, health state), character recognition, bar/QR code reading, object recognition, detection of humans or other live beings, gait detection, human or other motion trajectory detection, detection of vehicles and vehicle trajectories, gesture recognition, and/or emotion recognition. In one example, a health state of an individual may be assessed when a temperature sensor can capture temperature information relating to an individual and may be able to detect whether the individual has a high fever.

In some cases, the imaging system may comprise one or more IR illuminators and one or more optical sensors. The placement of the IR illuminators on the scene may be determined for optimal visibility. For example, the illumination power and the location of the one or more IR illuminators may be optimized such that a wide field of view and long range of illumination with improved visibility can be achieved. An IR illuminator is a tool that emits light in the infrared spectrum. For example, the IR illuminator may generate infrared radiation or electromagnetic radiation where wavelengths are between 700 nanometers and 1 millimeter. In some embodiments, one or more IR illuminators may flash infrared light to the scene to assist in acquiring IR images with adequate quality. The IR illuminators may allow night vision to function with no visible light on the scene and drastically improve the sensitivity of the vision device. The IR illuminator can be of any kind emitting light in the infrared spectrum. For example, the illuminator unit may contain arrays of IR LEDs, and may have at least 20-foot, 30-foot, 30-foot, 40-foot, 50-foot, 60-foot, 70-foot, 80-foot, 90-foot, 100-foot, 200-foot, 300-foot, 400-foot, or 500-foot illumination range, including increments therein.

The imaging system may comprise any suitable optical sensor that is sensitive to IR light. For example, the optical sensor may use Indium Gallium Arsenide (InGaAs) focal plane array (FPA) technology and the optical sensor may have a variety of formats such as 320×256, 640×512, and 1280×1024 pixels.

Multi-Stage Hierarchical Computer Vision Model

In some embodiments, one or more of the plurality of multi-stage hierarchical computer vision models utilizes a neural network. In some embodiments, the neural network comprises a convolutional neural network. In some embodiments, one or more of the plurality of multi-stage hierarchical computer vision models comprises a R-CNN model or a YOLO model. In some embodiments, one or more of the plurality of multi-stage hierarchical computer vision models comprises a branching algorithm. In some embodiments, one or more of the plurality of multi-stage hierarchical computer vision models performs operations comprising: analyzing an uploaded recorded video to identify a first class of object; if the first class of object is identified, analyzing the uploaded recorded video to identify a first sub-class of object; and if the first sub-class of object is identified, analyzing the uploaded recorded video to identify a second sub-class of object. In some embodiments, the class of the object comprises a vehicle class, a person class, an animal class, a weather class, a fire class, or any other class associated with a potential threat to be monitored. In some embodiments, a subclass of the vehicle class comprises a known vehicle, an unknown vehicle, a vehicle type (i.e., car, truck, pickup, sports utility vehicle (SUV), or mortorcycle), or any combination thereof. In some embodiments, a subclass of the person class comprises a known person, an unknown person, a person type (i.e., policeperson, delivery person, or gardener). In some embodiments, the secure network connection prevents the one or more back-end applications from allowing inbound connections, apart from receiving user requests from the interface and recorded video uploads from the local video recorder. In some embodiments, the local video recorder is further configured to apply one or more of the multi-stage hierarchical computer vision models to the video stream to tag the video with one or more identified classes of objects. In some embodiments, the video stream is stored in the memory of the local video recorder as a plurality of discrete files. In some embodiments, storing a plurality of discrete files at the local video recorder enables transmission at higher video quality (i.e., frame rate, resolution, colors, etc.). In some embodiments, storing a plurality of discrete files at the local video recorder reduces the risk of saturation of communication networks when transmitting video, thus reducing or preventing data loss and dropping packets. In some embodiments, storing a plurality of discrete files at the local video recorder enables transmission of video through networks with lower bandwidth capacity.

In some embodiments, each discrete file includes about 1 second to about 100 seconds. In some embodiments, each discrete file includes about 1 second to about 2 seconds, about 1 second to about 5 seconds, about 1 second to about 10 seconds, about 1 second to about 20 seconds, about 1 second to about 30 seconds, about 1 second to about 40 seconds, about 1 second to about 50 seconds, about 1 second to about 60 seconds, about 1 second to about 70 seconds, about 1 second to about 80 seconds, about 1 second to about 100 seconds, about 2 seconds to about 5 seconds, about 2 seconds to about 10 seconds, about 2 seconds to about 20 seconds, about 2 seconds to about 30 seconds, about 2 seconds to about 40 seconds, about 2 seconds to about 50 seconds, about 2 seconds to about 60 seconds, about 2 seconds to about 70 seconds, about 2 seconds to about 80 seconds, about 2 seconds to about 100 seconds, about 5 seconds to about 10 seconds, about 5 seconds to about 20 seconds, about 5 seconds to about 30 seconds, about 5 seconds to about 40 seconds, about 5 seconds to about 50 seconds, about 5 seconds to about 60 seconds, about 5 seconds to about 70 seconds, about 5 seconds to about 80 seconds, about 5 seconds to about 100 seconds, about 10 seconds to about 20 seconds, about 10 seconds to about 30 seconds, about 10 seconds to about 40 seconds, about 10 seconds to about 50 seconds, about 10 seconds to about 60 seconds, about 10 seconds to about 70 seconds, about 10 seconds to about 80 seconds, about 10 seconds to about 100 seconds, about 20 seconds to about 30 seconds, about 20 seconds to about 40 seconds, about 20 seconds to about 50 seconds, about 20 seconds to about 60 seconds, about 20 seconds to about 70 seconds, about 20 seconds to about 80 seconds, about 20 seconds to about 100 seconds, about 30 seconds to about 40 seconds, about 30 seconds to about 50 seconds, about 30 seconds to about 60 seconds, about 30 seconds to about 70 seconds, about 30 seconds to about 80 seconds, about 30 seconds to about 100 seconds, about 40 seconds to about 50 seconds, about 40 seconds to about 60 seconds, about 40 seconds to about 70 seconds, about 40 seconds to about 80 seconds, about 40 seconds to about 100 seconds, about 50 seconds to about 60 seconds, about 50 seconds to about 70 seconds, about 50 seconds to about 80 seconds, about 50 seconds to about 100 seconds, about 60 seconds to about 70 seconds, about 60 seconds to about 80 seconds, about 60 seconds to about 100 seconds, about 70 seconds to about 80 seconds, about 70 seconds to about 100 seconds, or about 80 seconds to about 100 seconds, including increments therein. In some embodiments, each discrete file includes about 1 second, about 2 seconds, about 5 seconds, about 10 seconds, about 20 seconds, about 30 seconds, about 40 seconds, about 50 seconds, about 60 seconds, about 70 seconds, about 80 seconds, or about 100 seconds, including increments therein. In some embodiments, each discrete file includes at least about 1 second, about 2 seconds, about 5 seconds, about 10 seconds, about 20 seconds, about 30 seconds, about 40 seconds, about 50 seconds, about 60 seconds, about 70 seconds, or about 80 seconds, including increments therein. In some embodiments, each discrete file includes at most about 2 seconds, about 5 seconds, about 10 seconds, about 20 seconds, about 30 seconds, about 40 seconds, about 50 seconds, about 60 seconds, about 70 seconds, about 80 seconds, or about 100 seconds, including increments therein.

Local Video Recorder

In some embodiments, the local video recorder is deployed at the user site. In some embodiments, the local video recorder is configured to provide the video stream to the one or more back-end applications as a continuous live stream upon request generated at the interface. In some embodiments, the local video recorder is configured to apply an edge computer vision algorithm. In some embodiments, the local video recorder is configured to apply an edge computer vision algorithm to detect an object in the video stream. In some embodiments, the local video recorder is configured to apply an edge computer vision algorithm to determine an area of the object. In some embodiments, if the edge computer vision algorithm detects and determines the area of the object, the edge computer vision algorithm records the video stream. In some embodiments, if the edge computer vision algorithm detects and determines the area of the object above a threshold area, the edge computer vision algorithm records the video stream and upload the recorded video to the one or more back-end applications. In some embodiments, the area of the object is a percentage of the video stream field of view. In some embodiments, the edge computer vision algorithm further detects a distance from the video camera to the object, wherein the area of the object is based on a percentage of the video stream field of view and on the distance from the video camera. In some embodiments the threshold area is set based on an orientation of the field of view of the video camera, a distance from the video camera to a surveillance target (i.e., a doorway, a gate, a fence), or both. In some embodiments, uploading the recorded video only when the edge computer vision algorithm detects the object increases the transmission speed without requiring additional bandwidth. In some embodiments, uploading the recorded video only when the edge computer vision algorithm detects the object reduces the quantity of uneventful video streams that must be stored.

In some embodiments, the local video recorder is further configured to apply one or more of the multi-stage hierarchical computer vision models to the video stream to tag the video with one or more identified classes of objects. In some embodiments, the multi-stage hierarchical computer vision models to the video stream to tag the video with one or more identified classes of objects based on the determined area of the object. In some embodiments, the video stream is stored in the memory of the local video recorder as a plurality of discrete files. In some embodiments, the video stream is stored in the memory of the local video recorder as a plurality of discrete files to enable faster computation and/or faster transmission without increased bandwidth requirements. In some embodiments, the plurality of discrete files are concatenated once transmitted and/or used for calculation. In some embodiments, each of the plurality of discrete files are transmitted at different times.

In some embodiments, each discrete file includes about 1 second to about 100 seconds. In some embodiments, each discrete file includes about 1 second to about 2 seconds, about 1 second to about 5 seconds, about 1 second to about 10 seconds, about 1 second to about 20 seconds, about 1 second to about 30 seconds, about 1 second to about 40 seconds, about 1 second to about 50 seconds, about 1 second to about 60 seconds, about 1 second to about 70 seconds, about 1 second to about 80 seconds, about 1 second to about 100 seconds, about 2 seconds to about 5 seconds, about 2 seconds to about 10 seconds, about 2 seconds to about 20 seconds, about 2 seconds to about 30 seconds, about 2 seconds to about 40 seconds, about 2 seconds to about 50 seconds, about 2 seconds to about 60 seconds, about 2 seconds to about 70 seconds, about 2 seconds to about 80 seconds, about 2 seconds to about 100 seconds, about 5 seconds to about 10 seconds, about 5 seconds to about 20 seconds, about 5 seconds to about 30 seconds, about 5 seconds to about 40 seconds, about 5 seconds to about 50 seconds, about 5 seconds to about 60 seconds, about 5 seconds to about 70 seconds, about 5 seconds to about 80 seconds, about 5 seconds to about 100 seconds, about 10 seconds to about 20 seconds, about 10 seconds to about 30 seconds, about 10 seconds to about 40 seconds, about 10 seconds to about 50 seconds, about 10 seconds to about 60 seconds, about 10 seconds to about 70 seconds, about 10 seconds to about 80 seconds, about 10 seconds to about 100 seconds, about 20 seconds to about 30 seconds, about 20 seconds to about 40 seconds, about 20 seconds to about 50 seconds, about 20 seconds to about 60 seconds, about 20 seconds to about 70 seconds, about 20 seconds to about 80 seconds, about 20 seconds to about 100 seconds, about 30 seconds to about 40 seconds, about 30 seconds to about 50 seconds, about 30 seconds to about 60 seconds, about 30 seconds to about 70 seconds, about 30 seconds to about 80 seconds, about 30 seconds to about 100 seconds, about 40 seconds to about 50 seconds, about 40 seconds to about 60 seconds, about 40 seconds to about 70 seconds, about 40 seconds to about 80 seconds, about 40 seconds to about 100 seconds, about 50 seconds to about 60 seconds, about 50 seconds to about 70 seconds, about 50 seconds to about 80 seconds, about 50 seconds to about 100 seconds, about 60 seconds to about 70 seconds, about 60 seconds to about 80 seconds, about 60 seconds to about 100 seconds, about 70 seconds to about 80 seconds, about 70 seconds to about 100 seconds, or about 80 seconds to about 100 seconds, including increments therein. In some embodiments, each discrete file includes about 1 second, about 2 seconds, about 5 seconds, about 10 seconds, about 20 seconds, about 30 seconds, about 40 seconds, about 50 seconds, about 60 seconds, about 70 seconds, about 80 seconds, or about 100 seconds, including increments therein. In some embodiments, each discrete file includes at least about 1 second, about 2 seconds, about 5 seconds, about 10 seconds, about 20 seconds, about 30 seconds, about 40 seconds, about 50 seconds, about 60 seconds, about 70 seconds, or about 80 seconds, including increments therein. In some embodiments, each discrete file includes at most about 2 seconds, about 5 seconds, about 10 seconds, about 20 seconds, about 30 seconds, about 40 seconds, about 50 seconds, about 60 seconds, about 70 seconds, about 80 seconds, or about 100 seconds, including increments therein.

FIG. 1 shows an example of a network of cameras with improved security. The cloud or backend applications may allow users 130 to control or access live views of the trusted cameras 105 in the network. The imaging system 110 may include a network of cameras 105 deployed at an environment.

The video surveillance system may employ an edge intelligence paradigm that data processing and inference is performed at the edge or edge computing unit (e.g., on-site server, Cloud Video Recorder (CVR) 120) while the predictive models may be built, developed, and trained on a cloud/data center 100, and run on the edge computing unit or local video recorder (e.g., CVR 120) for inference. The on-site computing unit may implement a local video recorder (e.g., CVR 120) that is configured to request a video stream from at least one video camera; provide the video stream to one or more back-end applications running on the cloud/data center 100 as a continuous live stream upon request generated at the interface; apply an edge computer vision algorithm to detect an object in the video stream and determine an area of the object; and if the edge computer vision algorithm detects and determines the area of the object above a threshold area, record the video stream to the memory and upload the recorded video to the one or more back-end applications.

In some embodiments, the CVR may employ a data transmission scheme to transmit the videos upon detecting an area of objects in the video. The data transmission scheme may specify how data are transmitted. For instance, the data transmission scheme may specify compression methods (e.g., lossless compression algorithm, lossy compression algorithms, encoding, etc.), or encryption methods (e.g., RSA, triple DES, Blowfish, Twofish, AES, etc.) used for transmission.

As described above, the edge component 120 may be in communication with an imaging system 110 or one or more image sensors (e.g., visible light, infrared, etc.). The edge computing component 120 may be local to the imaging system 110.

Systems and methods of the disclosure may provide an efficient and highly scalable edge data orchestration platform that enables real-time, on-site video surveillance orchestration. In some cases, data managed or transmitted to the on-site edge computing component or local video recorder 120 may include, for example, data streams from the video camera or imaging systems/components.

In some cases, data transmitted to the edge computing server from the cloud or backend systems/components 100 may include control signals or instructions to adjust one or more parameters of the computer vision component or imaging devices and/or instructions related to image processing performed by the imaging devices.

As shown in FIG. 2, the network of cameras 215 may include one or more untrusted cameras 210 that may live on the local area network (LAN). The platform may prevent malicious actor 235 accessing the cameras 205 as the untrusted cameras 205 are disconnected from the Internet 230 via a router 225, a network switches 210, or both. The untrusted cameras may not be given any access to the wide-area network such as Internet 230 by restricting the routing rules. The untrusted cameras may be restricted from receiving inbound connections or making any outbound connections to the Internet 230. The untrusted cameras may be permitted to serve video directly to the local edge component e.g., Cloud Video Recorder (CVR) 220. The CVR may request video streams from the one or more untrusted cameras (e.g., for recording, for Live View, etc.). The request may be on-demand basis or according to pre-determined schedule. The cloud 200 may receive video uploads only from the CVR without direct communication with the one or more untrusted cameras. In some embodiments, the one or more untrusted cameras 210 are cameras produced or distributed by a foreign entity.

Back-End Application(s)

In some embodiments, the one or more back-end applications runs remotely from the user site, in communication with the local video recorder by a secure network connection. In some embodiments, the one or more back-end applications is configured to perform operations comprising: maintain a data store comprising a plurality of multi-stage hierarchical computer vision models, each configured for identification of a class of objects; apply one or more of the multi-stage hierarchical computer vision models to the uploaded recorded video to tag the video with one or more identified classes of objects; and provide an interface. In some embodiments, the one or more back-end applications comprises a cloud application running on a cloud computing infrastructure.

In some embodiments, the one or more back-end applications is executed remotely from the user site, in communication with the local video recorder by a secure network connection. The one or more back-end applications may maintain a data store comprising a plurality of multi-stage hierarchical computer vision models, each configured for identification of a class of objects; apply one or more of the multi-stage hierarchical computer vision models to the uploaded recorded video to tag the video with one or more identified classes of objects; and provide a user interface or a graphical user interface (GUI). The GUI may allow a user to request the continuous live stream from the local video recorder; and allow the user to view uploaded recorded videos and sort or filter the video by one or more tags corresponding to identified classes of objects.

In some embodiments, the application running on the cloud or the system may be configured to access a plurality of video streams captured by a video camera; apply one or more trained models to the plurality of video streams to tag the video streams with one or more identified classes of objects; and display, on a graphical user interface, a plurality of sensitivity levels for a user to select to filter the plurality of video streams by the one or more identified classes of objects.

In some embodiments, the GUI may provide motion analytics and/or social relationship analysis of people identified in the video streams. In some cases, social relationships may be predicted by a machine learning algorithm trained model. For example, a social relationship (e.g., cluster, group of people, social pod) may be classified/identified for multiple people detected in one or more video streams. In some cases, the social relationship may include a social pod which is a core group of friends or family who agree to limit their in-person social activities to only each. In some cases, a safety requirement may be different for people within or outside of a social pod. In some cases, the system may also train one or more models to identify whether people are complying with a safety protocol such as whether people wear masks, stay social distance or a group of people are not required to wear masks or stay social distance if they are identified to be in a social pod. The system can be used to identify various other non-compliance motion/events/activities/operations. Details about the motion analytics, safety compliance or social relationship classification are described later herein.

As described above, the provided video surveillance platform may employ an edge intelligence paradigm that at least a portion of data processing can be performed at the edge. In some instances, machine learning model may be built and trained on the cloud and run on the edge device or edge system (e.g., hardware accelerator). The software stack of the video surveillance platform can be a combination of services that run on the edge and cloud. In some cases, software or services that run on the edge may employ a model or data transmission mechanism for data orchestration. For instance, the edge computing component may apply an edge computer vision algorithm to detect an object in the video stream and determine an area of the object. If the edge computer vision algorithm may detect and determine the area of the object, record the video stream to the memory and upload the recorded video to the one or more back-end applications upon detection of the area of the object.

Software or services that run on the cloud may provide one or more computer vision algorithms for performing motion analytics, object identification, social relationship analysis of the uploaded video. The services that run on the cloud may also provide a predictive model creation and management system for training, developing, and managing predictive models for computer vision, motion analytics, social relationship classification and various other safety purposes. In some cases, the data orchestrator deployed at the edge may support ingesting of data stream into a local storage repository (e.g., local time-series database), data cleansing, data enrichment (e.g., merging third-party data with processed data), data alignment, data annotation, data tagging (e.g., metadata creation), or data aggregation.

The edge computing component and the backend application may analyze the data streams with aid of an intelligent framework including one or more predictive models, motion detection models and/or edge computer vision algorithm to detect an object in the video stream and determine an area of the object, the output result may be an object detected in the video stream, the area of the object, a decision to record the video stream to the memory and upload the recorded video to the one or more back-end applications, and various other functionalities as described later herein. The edge computing component may be coupled to a local database.

The local database may comprise storage containing a variety of data consistent with disclosed embodiments. For example, the databases may store raw data collected from the imaging systems, historical data, data about a predictive model (e.g., parameters, hyper-parameters, model architecture, threshold, rules, etc), data generated by a predictive model (e.g., intermediary results, output of a model, latent features, input and output of a component of the model system, etc.), safety protocols/law or regulatory related data, algorithms, and the like. In certain embodiments, one or more of the local databases may be co-located with the edge computing component, may be co-located with one another on the local network, or may be located separately from other local devices. One of ordinary skill will recognize that the disclosed embodiments are not limited to the configuration and/or arrangement of the database(s).

The local database may be one or more memory devices configured to store data. Additionally, the databases may also, in some embodiments, be implemented as a computer system with a storage device. In some cases, the databases such as the local database and cloud databases may be used by components of the video surveillance platform to perform one or more operations consistent with the disclosed embodiments. One or more cloud databases and local databases of the platform may utilize any suitable database techniques. For instance, structured query language (SQL) or "NoSQL" database may be utilized for storing the data transmitted from the edge computing system or the local network such as real-time data (e.g., audio/video data, metadata, messages, etc.), parameters of multi-stage hierarchical computer vision models, processed data such as identification of a class of objects and various others. Some of the databases may be implemented using various standard data-structures, such as an array, hash, (linked) list, struct, structured text file (e.g., XML), table, JavaScript Object Notation (JSON), NOSQL and/or the like. Such data-structures may be stored in memory and/or in (structured) files. In another alternative, an object-oriented database may be used. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. In some embodiments, the database may include a graph database that uses graph structures for semantic queries with nodes, edges and properties to represent and store data. If the database of the present invention is implemented as a data-structure, the use of the database of the present invention may be integrated into another component such as the component of the present invention. Also, the database may be implemented as a mix of data structures, objects, and relational structures. Databases may be consolidated and/or distributed in variations through standard data processing techniques. Portions of databases, e.g., tables, may be exported and/or imported and thus decentralized and/or integrated.

The backend system or cloud may comprise one or more cloud applications such as a multi-stage hierarchical computer vision application, a predictive model creation and management system for training, developing, and managing predictive models for computer vision, motion analytics, social relationship identification, cloud analytics portal, user interface or GUI that can be accessed by users or third-party entities. The analytics portal may provide visualization of the motion analytics, social relationship classification, non-compliance activity/event detection, real-time view and analytics, as well as maintenance of devices, applications running on the edge computing server and on the cloud. In some cases, a third-party entity may be permitted to access the cloud data repository or cloud applications for various safety purposes.

Data captured by the on-site imaging systems, video streams, as well as analytics data and management data may be communicated via a network architecture well-suited for use in a wide variety of environment. In some cases, the network architecture may comprise a local network that may employ a topology or configuration capable of operating in challenging environments where obstructions or distance prevent wireless communication from a device to a hub. For example, the local network may employ high grade Wi-Fi Mesh technology providing stronger and more reliable Wi-Fi signals in an indoor environment. Alternatively, or in addition to, the local network may be a mesh network where devices communication with each other without a centralized device, such as a hub, switch, or router. In some cases, an imaging device may be an "IP camera" (i.e., a camera capable of communicate using the Internet Protocol), a USB camera (i.e., a camera having a Universal Serial Bus interface), or a camera capable of communicating with another device by any suitable means.

In some embodiments, the network architecture may comprise interconnect infrastructure or fabric such as purpose-built hardware, herein referred to as "gateways," which are compatible with a wireless protocol. The local network may have stationary configuration or dynamic configuration, and the video data stream may be transmitted to an edge computing component for analysis (to determine whether to be transmitted to the cloud for further analysis). The edge computing component may be part of the imaging system (e.g., camera) or in communication with the imaging system. The edge computing component may be in communication with a remote cloud/data center through the gateways for downloading trained predictive models and transmitting data such as video data and various others for further analysis and management.

In some embodiments, the local network may be a combination of wired and wireless network that is suitable for indoor and outdoor environment. In some cases, the local network may comprise a communication unit such as a Wi-Fi controller or switch responsible for deciding a data path or data link according to a routing table. The network may also comprise a gateway connecting the local network to a remote network or network entity (e.g., cloud). The gateway device may provide long range RF wireless coverage (e.g., DLPWAN) to connect the local network. The gateway devices may allow long range communications. In some cases, the long-range RF wireless coverage may be a narrowband wireless network coverage. In some cases, the gateway devices may employ any suitable coding or modulation scheme such as binary shift keying (BSK), direct sequence spread spectrum (DSSS), frequency hopping spread spectrum, or Gauss frequency-shift keying (GFSK), Quadrature Amplitude Modulation (QAM) or quadrature phase shift keying (QPSK), power amplification, forward error correction (FEC) and, various other data transmission methods. In some cases, the gateway devices may switch power amplification, bandwidth, and/or bitrate in real-time to optimize for signal quality, transmission rate, and/or battery life.

In some embodiments, the local network may be a combination of wired and wireless network. In some embodiments, the network configuration may comprise a plurality of Wi-Fi access points connected to a plurality of network switches or hubs (e.g., Ethernet switch), and one or more beacons. One or more Wi-Fi access points may be cable wired to one or more Ethernet switches. The plurality of network switches may be wire/cable connected to a power source. The network may also comprise a gateway such as the IS (Internet service) Wi-Fi access point to connect the local network to a remote network (e.g., Internet) or network entity. In some cases, the gateways may connect to a wide area network (e.g., Internet) or cloud using any TCP/IP or UDP-based capable backhaul, such as Ethernet, Wi-Fi or cellular 4G or 5G. The gateways may contain a radio frontend capable of listening to several MHz of RF wireless spectrum at a time, and/or configured to hear all network traffic transmitted within that spectrum. In some cases, the gateways may use synchronized frequency hopping schemes.

As described above, the backend applications may comprise computer vision algorithms, motion detection and analytics, social relationship classification, multi-stage hierarchical computer vision models, or other algorithms as described elsewhere herein, cloud analytics portal or GUI that provide visualization of the motion analytics or non-compliance behavior detections. In some embodiments, one or more trained predictive models utilized by the computer vision system, or the surveillance platform may be dynamically adjusted and tuned to adapt to different individuals, different deployment environment, or different use conditions over time with automatically generated supervised features (e.g., labeled data). In some cases, one or more predictive models utilized by the multimodal framework may be continuously updated/re-trained without human intervention.

The term "labeled dataset," as used herein, generally refers to a paired dataset used for training a model using supervised learning. The term "label" or "label data" as used herein, generally refers to ground truth data. During a training process, the weights or parameters of a deep learning model (e.g., CNN) are tuned to approximate the ground truth data thereby learning a mapping from input image/video data to the desired output. The labeling techniques of the present disclosure may beneficially allow for automatic updating/refining of a trained model based on newly collected video data or user input data after deployment of a model. For instance, after a model is trained and deployed to an environment, the model may be continuously updated by tuning the parameters/weights based on the video data stream or user feedback received from the GUI (e.g., for automatically creating label data). Alternatively, or additionally, the labeling techniques may be applied in the model training and development stage.

In some cases, the one or more trained predictive models utilized by the computer vision system, the edge computing system or the cloud applications may be dynamically adjusted and tuned to adapt to the individuals, deployment environment, or use conditions over time with automatically generated label data. The input of the one or more trained models may be videos and the output may include object detected in the videos such as an identification of the object (e.g., name, facial recognition) or type of the object (e.g., object classification, tags), a motion of the object, a social relationship among multiple objects (e.g., social pod, a cluster), a compliance/non-compliance behavior (e.g., with/without wearing a mask) and various others. The label data along with image/video data may be used as input features for training the predictive models.

Machine Learning Algorithms

The machine learning algorithm can be any type of machine learning network such as: a neural network, convolutional neural network CNN, recurrent neural network RNN, a region-based CNN (R-CNN), Faster R-CNN, Mask R-CNN, a gradient-boosted classifier or repressor, or another supervised or unsupervised machine learning algorithm (e.g., generative adversarial network (GAN), Cycle-GAN, etc.). In some cases, the predictive model may be trained, developed, continual trained-retrained by a predictive model creation and management system as described elsewhere herein. In some embodiments, the deep learning algorithm may be convolutional neural network (CNN). The model network may be a deep learning network such as CNN that may comprise multiple layers. For example, the CNN model may comprise at least an input layer, a number of hidden layers and an output layer. A CNN model may comprise any total number of layers, and any number of hidden layers. The simplest architecture of a neural network starts with an input layer followed by a sequence of intermediate or hidden layers and ends with output layer. The hidden or intermediate layers may act as learnable feature extractors, while the output layer may output the improved image frame. Each layer of the neural network may comprise a number of neurons (or nodes). A neuron receives input that comes either directly from the input data (e.g., low quality image data etc.) or the output of other neurons, and performs a specific operation, e.g., summation. In some cases, a connection from an input to a neuron is associated with a weight (or weighting factor). In some cases, the neuron may sum up the products of all pairs of inputs and their associated weights. In some cases, the weighted sum is offset with a bias. In some cases, the output of a neuron may be gated using a threshold or activation function. The activation function may be linear or non-linear. The activation function may be, for example, a rectified linear unit (ReLU) activation function or other functions such as saturating hyperbolic tangent, identity, binary step, logistic, arcTan, softsign, parameteric rectified linear unit, exponential linear unit, softPlus, bent identity, softExponential, Sinusoid, Sinc, Gaussian, sigmoid functions, or any combination thereof. During a training process, the weights or parameters of the CNN are tuned to approximate the ground truth data thereby learning a mapping from the input raw image data to the desired output data (e.g., identity of object, type of object, a social pod, etc.).

The platform may utilize any machine learning algorithm suitable for object detection. For example, region-based object detection algorithms may be utilized for identifying objects (e.g., tags, object classification, images segmentation, instance segmentation), facial recognition, motion detection, identifying a social relationship (e.g., social pod) and safety-compliance/non-compliance behaviors, etc. In some cases, the object detection algorithm may be a You Only Look Once (YOLO) algorithm. The YOLO algorithm may be a single convolutional network predicts bounding boxes and the class probabilities for these boxes. YOLO and other convolutional neural network algorithms may score regions based on their similarities to predefined classes. High-scoring regions may be noted as positive detections of the class they most closely identify with. For example, in a live feed of traffic, YOLO may be used to detect different kinds of vehicles depending on which regions of the video score highly in comparison to predefined classes of vehicles. The YOLO algorithm may separate an image into a grid with each grid cell predicts some number of boundary boxes around objects that score highly with the predefined classes. Each boundary box has a respective confidence score of how accurate it assumes that prediction should be and detects only one object per bounding box. The boundary boxes are generated by clustering the dimensions of the ground truth boxes from the original dataset to find the most common shapes and sizes. Other object detection algorithms such as R-CNN, Fast R-CNN or Mask R-CNN can also be employed.

Figure 3:
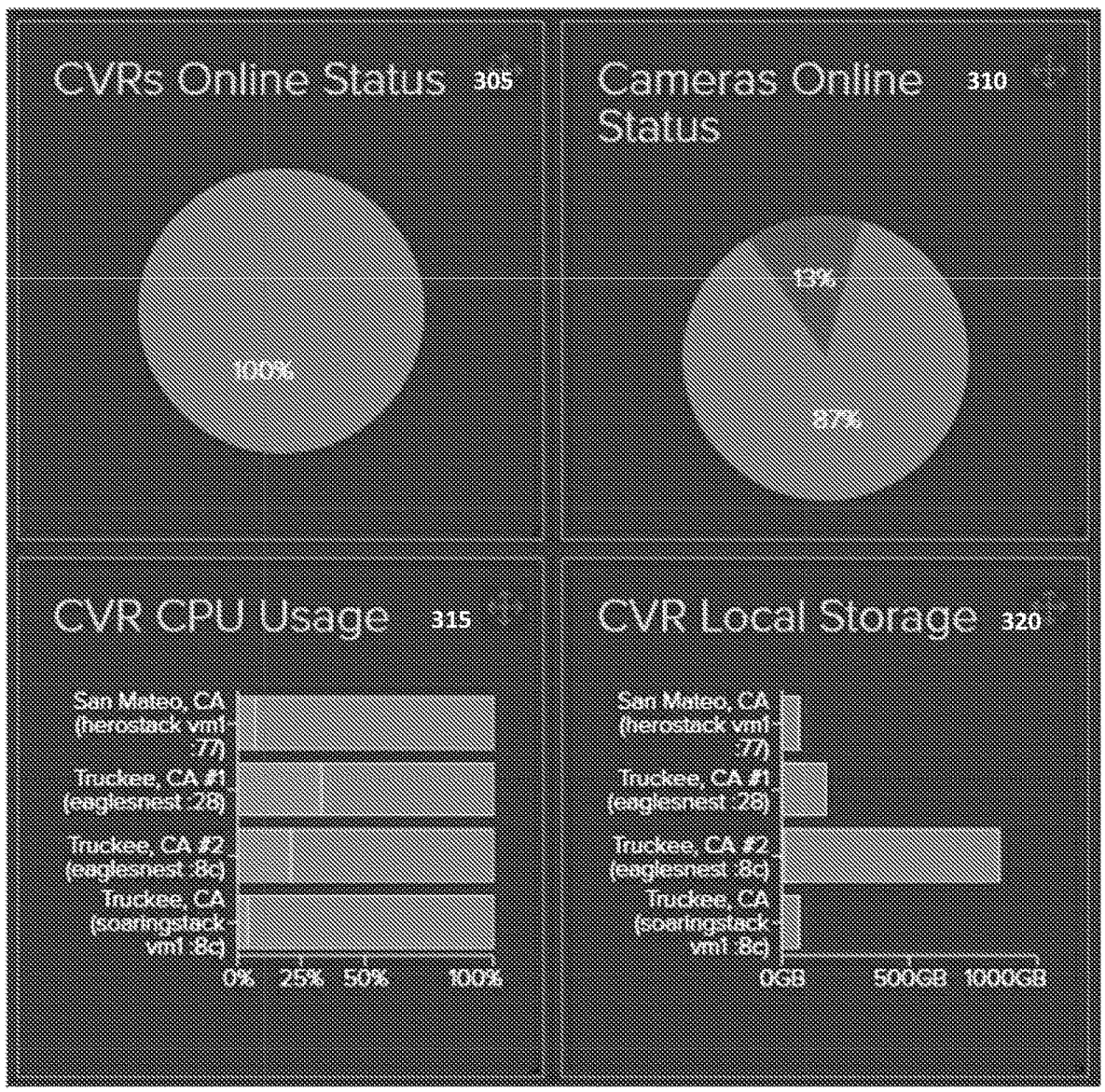

FIGS. 3 and 4 show an example of a graphical user interface (GUI) of a dashboard 300 400, in accordance with some embodiments of the present disclosure. The dashboard may display an online status of the video data e.g., Cloud Video Recorder (CVRs) 305, CVR CPU usage 315, CVR local storage 320, cameras online status 310, and recordings status. The dashboard may provide an intuitive interface using color coding for representing different data. For example, the CVR CPU usage 315 plot may be color coded such that blue color may indicate videos are still onsite (e.g., stored in the onsite/local storage) and green color may indicate videos that have been uploaded offsite. FIG. 4 shows an example of a graphical user interface (GUI) of a dashboard 400 of backlogged recordings, wherein each backlogged recording is associated with a location, a pending metadata upload quantity, a pending video upload quantity, and a last update time.

Figure 5:
FIG. 5 shows an example of GUI displaying live view provided by the imaging system of the platform.

The GUI may also provide live view captured by cameras deployed in one or more environments. FIG. 5 shows an example of GUI displaying live view provided by the imaging system of the platform. The live view may provide video streams captured by one or more types of imaging devices such as bright light, infrared camera and thermal camera (passive infrared). In some cases, a user may be allowed to view additional details about the live view such as camera name, HTTP status, number of cataloged videos captured by the camera, failed uploads and various other information. A user may also modify the layout of the live view by dragging a selected view to a preferred location and/or rearrange the multiple views.

Figure 6:
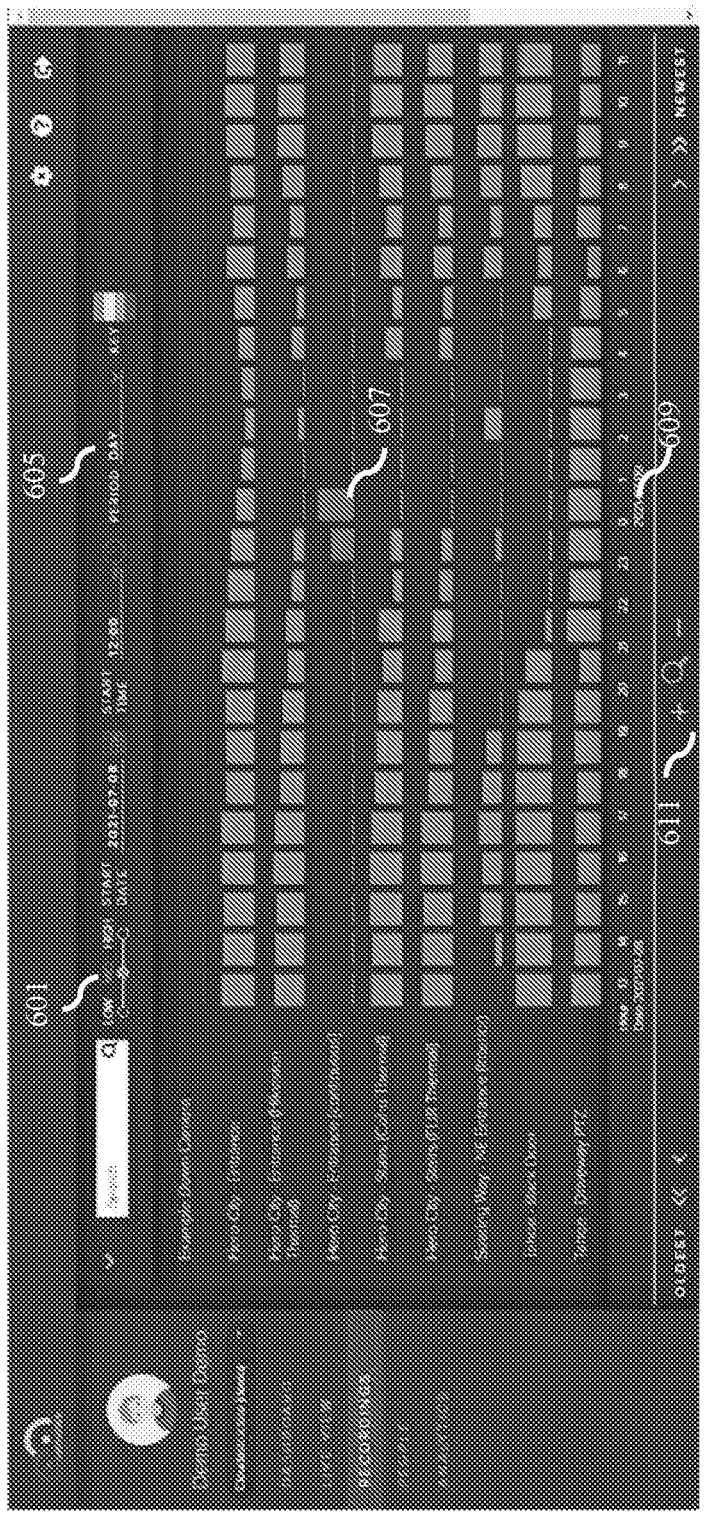
FIGS. 6-8 show various examples of UIs for displaying the motion analytics or videos with respect to the motion detection or object detection.

FIG. 6 shows an example of UI including a timeline 609 along which bar graphs 607 representative of detected motion events. In the illustrated example, each bar 607 may represent the number of detected motion events at a time point 605 (e.g., day). A higher bar may correspond to greater number of motion events or clips with detected motions at a time point 605. A user may change the time period 605 for viewing the motion analytics. The number of detected motion events may be the same as the number of recording clips. In some cases, each clip may contain one or more detected motion events.

The UI may allow users to adjust a sensitivity level 601 for the motion detection. For example, a "low" sensitivity level 601 601 may return fewer motion events/recording clips and a "high" sensitivity level 601 may return more motion events/recording clips. The sensitivity level 601 may be a threshold to determine whether a motion event with a score predicted by the trained model is a motion event. For instance, increasing the sensitivity level 601 (e.g., "high" level) may lower the threshold such that more motions with lower probability scores are determined to be detected events and displayed to the user on the GUI. For example, when a user selected a higher sensitivity level 601 (e.g., selecting "high"), there is a lower standard/threshold to determine whether an object with a particular label/tag or whether a motion is detected within the clip thus resulting in more clips identified for that label/tag or more clips with detected motion. Conversely, when the user selected a low sensitivity level 601 (e.g., selecting "low"), there is a higher standard/threshold to determine whether an object with a particular label/tag or whether a motion is detected within the clip thus resulting in fewer clips identified for that label/tag or fewer clips with detected motion.

The GUI may provide multiple sensitivity levels 601 (e.g., low, mid, high). In some cases, the number of sensitivity levels 601 may be pre-determined. Alternatively, or additionally, the number of sensitivity levels 601 may be determined automatically based on the use applications and the event characteristics. In some cases, an administrative user may define or modify the sensitivity levels 601 such that a more coarse or fine-grained adjustment can be provided.

In some embodiments, a user may select a sensitivity level 601 from the plurality of sensitivity levels 601 to filter the plurality of video streams by the one or more identified classes of objects (e.g., tags). Example of filtering the video streams by tags are described later herein.

Figure 7:
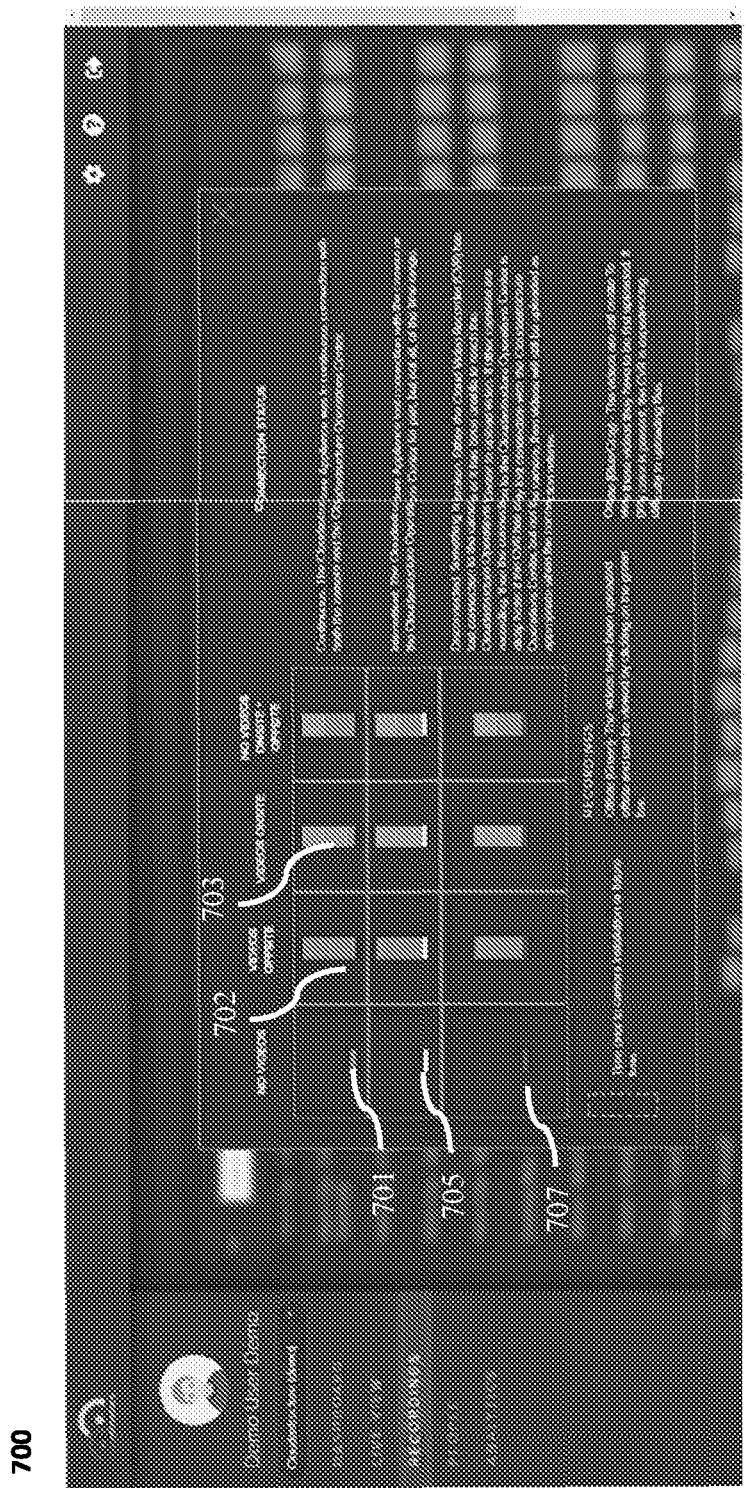

The UI can include functionality 611 for zooming in and out of the timeline (e.g., via a suitable zoom button). In some embodiments, a user of the UI may be able to select certain regions of the timeline to view the events within that region in greater detail. For example, as shown in FIG. 7, the motion events 701 may be displayed above the timeline as images, video clips, or other graphical elements representing the key content of the event. In some cases, a bounding box 703 may also be displayed indicating the detected object (e.g., people, mask, animal, vehicle, chair, etc.) and/or detected motion. By adjusting the display parameter (e.g., cozy, comfortable, compact, etc.), the timeline and the bar plots may be automatically adjusted for display with more or less information fitted on the screen.

The bar plot about the videos may be color-coded to show the status of the video, connection status and availability for viewing the video clips (e.g., with detected motion). A user may click on the bar plot to view additional details such as details about the disconnection issues. The additional details may be overlaid onto the bar plot for quick access. For example, the green colored bar may indicate videos have been uploaded offsite and can be viewed by clicking on the green bar 701. The blue color 703 may indicate videos are still onsite (e.g., stored in the onsite/local storage). A user may not be able to view these videos until they have been uploaded to the cloud. A gray color may represent that the CVR is experiencing difficulty in uploading files. A green color bar at the bottom 702 may indicate a continuous connection status meaning cloud is in continuous connection with both the camera and the operations center (e.g., edge computing system). A yellow color bar at the bottom 705 may indicate an intermittent connection status meaning cloud lost connection with the camera or the operations center for part, but not all, of the time range. A red color bar at the bottom 707 may represent a disconnected status indicating something is broken. For example, either the Cloud Video Recorder (CVR) has lost connection to the camera, or it has been unable to reach the operations center to upload video. In some cases, there may be backup (other) cameras are functioning to take recording of the same site, then the connection to the operations center is displayed as okay. In some cases, if the CVR has only lost connection with the operations center, but not the camera, then videos may still be uploaded as appropriate when the connection returns.

Figure 8:
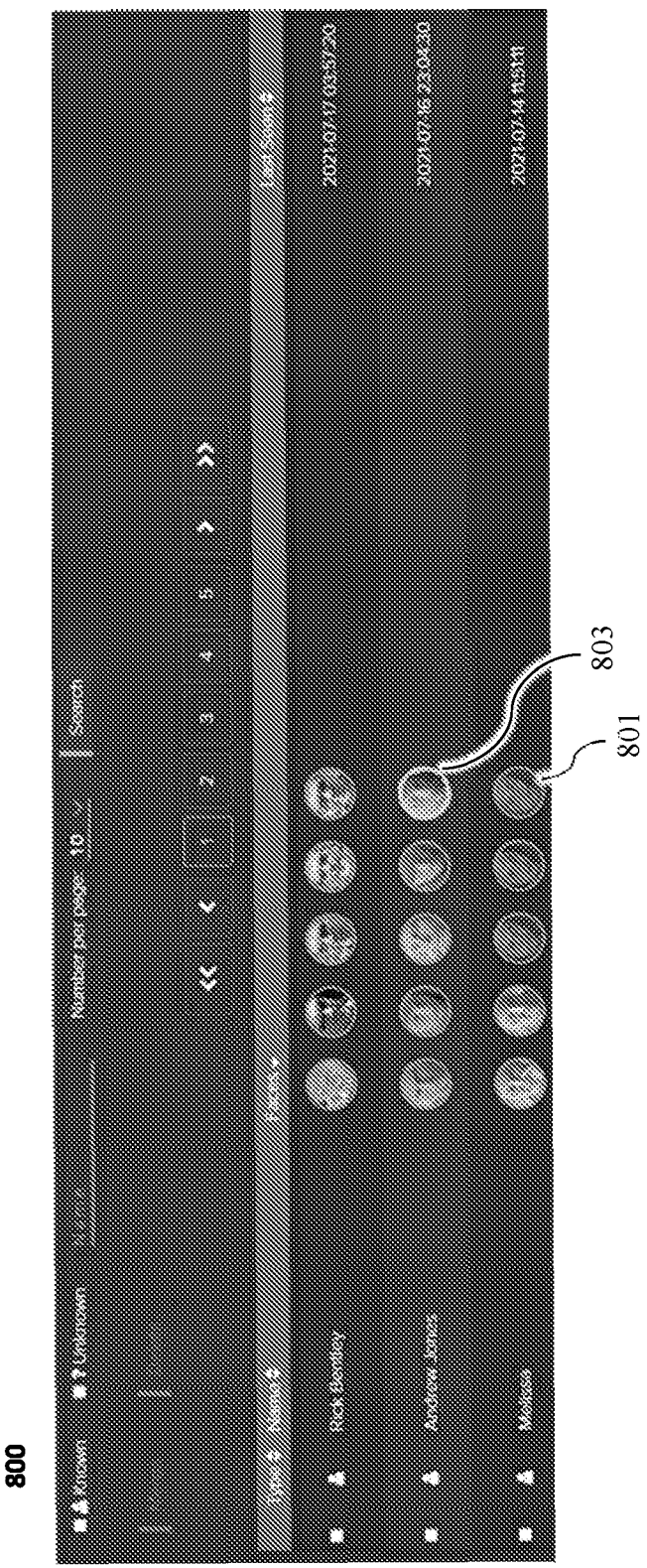

FIG. 8 shows an example of GUI displaying faces detected from one or more videos. The faces may be annotated indicating known person 801 and unknown person 803. A user may view an enlarged view of the face such as by clicking on the cropped face image 801, confirm the identity of the person (e.g., name A, name B, name C). In some cases, a user may view one or more cropped images of the detected face and verify the identity of the person or decline the predicted identity of the person. For example, the user may select the photos that show the person with a known identity for confirmation (e.g., de-selection may indicate a deny of the detected face correspond to the identity).

Figure 9:
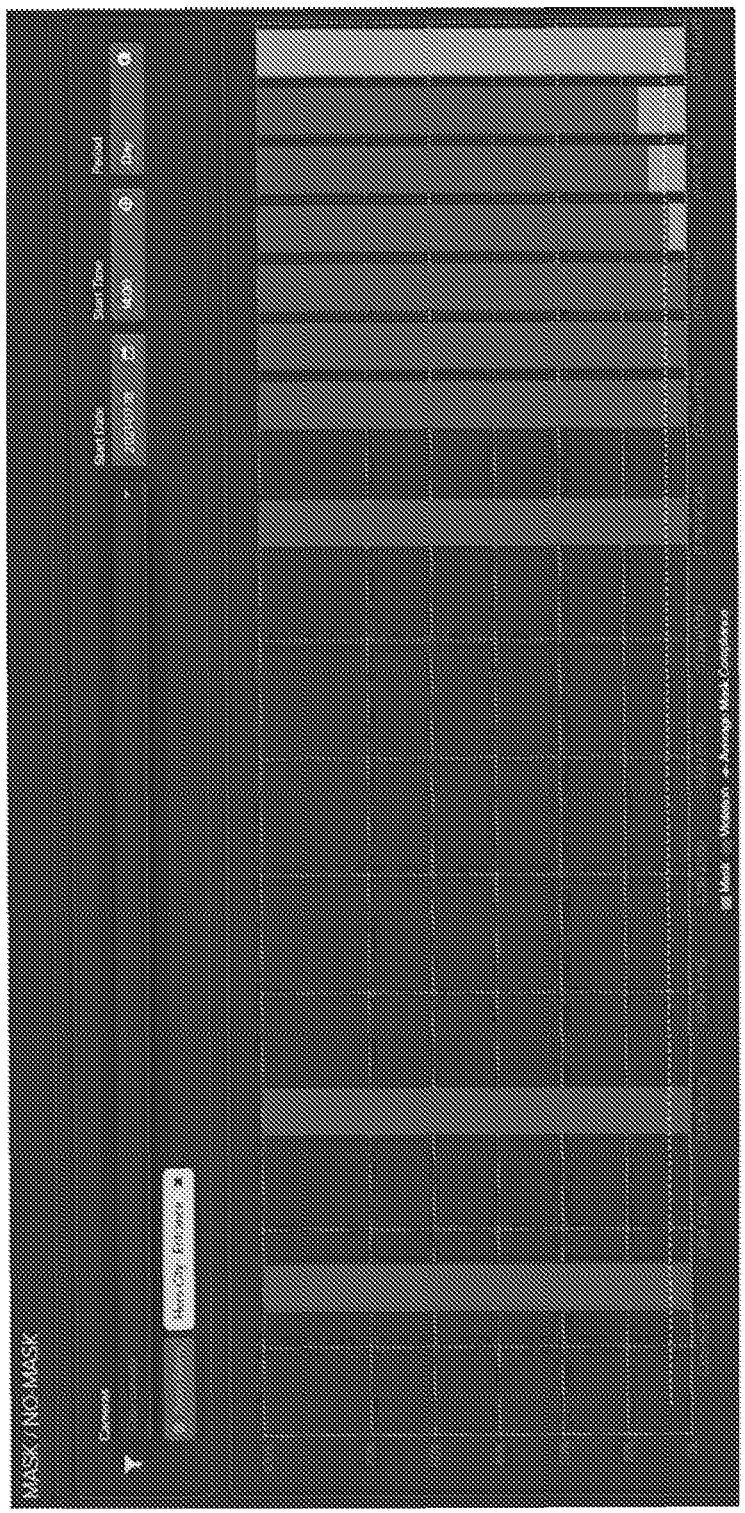
FIG. 9 shows an example of UI allowing users to view the analytics of compliance/non-compliance activity.

FIG. 9 shows an example of UI allowing users to view the analytics of compliance/non-compliance activity. For example, the GUI may display the number/percentage of violation of a safety requirement (e.g., no-masks) along a timeline. A user may select the monitored environment (e.g., selecting the location of the camera), change the time period to view the analytics results.

Certain Definitions

Unless otherwise defined, all technical terms used herein have the same meaning as commonly understood by one of ordinary skill in the art to which the present subject matter belongs.

As used in this specification and the appended claims, the singular forms "a," "an," and "the" include plural references unless the context clearly dictates otherwise. Any reference to "or" herein is intended to encompass "and/or" unless otherwise stated.

Reference throughout this specification to "some embodiments," "further embodiments," or "a particular embodiment," means that a particular feature, structure, or characteristic described in connection with the embodiment is included in at least one embodiment. Thus, the appearances of the phrase "in some embodiments," or "in further embodiments," or "in a particular embodiment" in various places throughout this specification are not necessarily all referring to the same embodiment. Furthermore, the particular features, structures, or characteristics may be combined in any suitable manner in one or more embodiments.

Computing System

Figure 10:
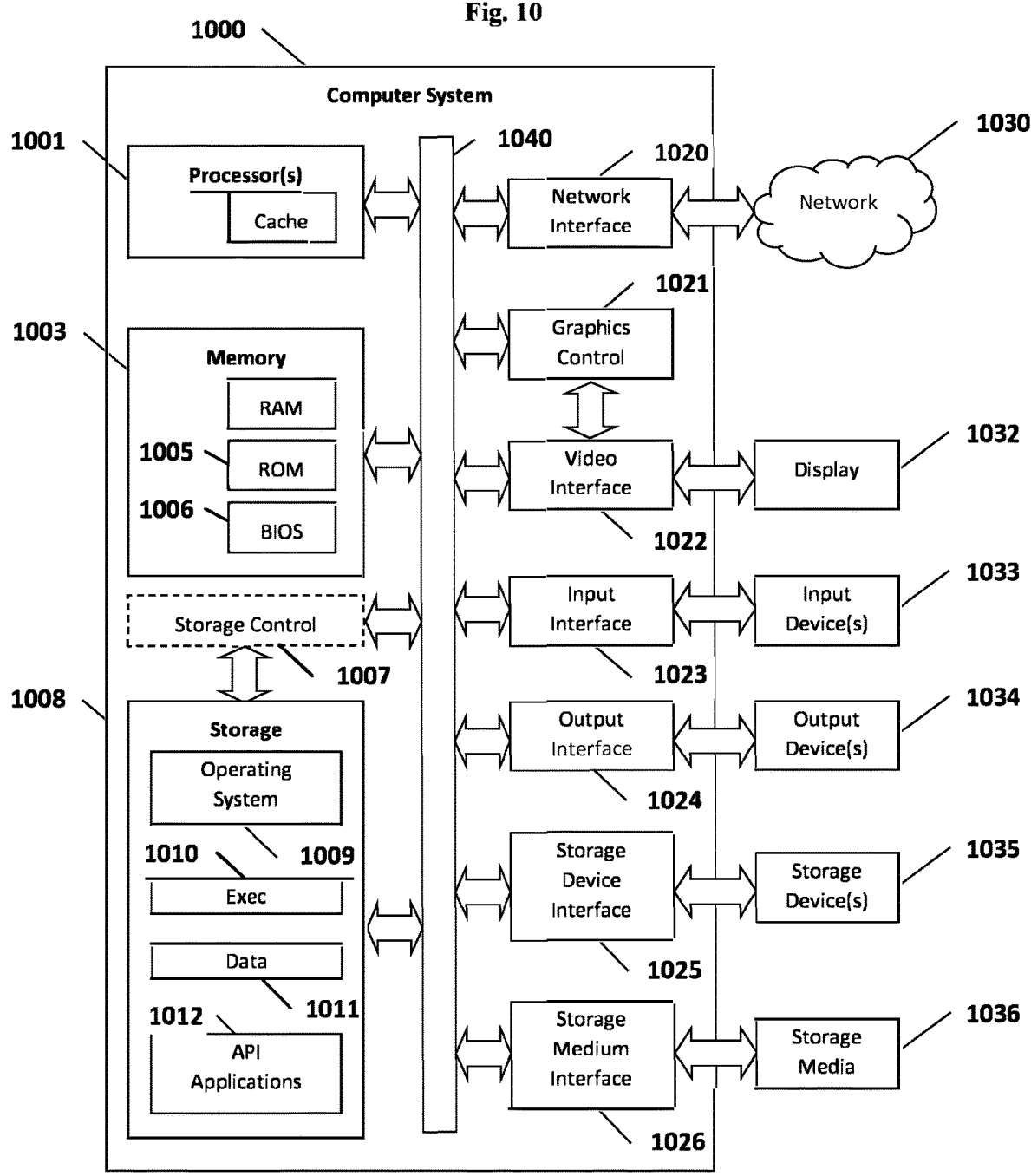
FIG. 10 shows a block diagram depicting an exemplary machine that includes a computer system.

Referring to FIG. 10, a block diagram is shown depicting an exemplary machine that includes a computer system 1000 (e.g., a processing or computing system) within which a set of instructions can execute for causing a device to perform or execute any one or more of the aspects and/or methodologies for static code scheduling of the present disclosure. The components in FIG. 10 are examples only and do not limit the scope of use or functionality of any hardware, software, embedded logic component, or a combination of two or more such components implementing particular embodiments.

Computer system 1000 may include one or more processors 1001, a memory 1003, and a storage 1008 that communicate with each other, and with other components, via a bus 1040. The bus 1040 may also link a display 1032, one or more input devices 1033 (which may, for example, include a keypad, a keyboard, a mouse, a stylus, etc.), one or more output devices 1034, one or more storage devices 1035, and various tangible storage media 1036. All of these elements may interface directly or via one or more interfaces or adaptors to the bus 1040. For instance, the various tangible storage media 1036 can interface with the bus 1040 via storage medium interface 1026. Computer system 1000 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Computer system 1000 includes one or more processor(s) 1001 (e.g., central processing units (CPUs) or general-purpose graphics processing units (GPGPUs)) that carry out functions. Processor(s) 1001 optionally contains a cache memory unit 1002 for temporary local storage of instructions, data, or computer addresses. Processor(s) 1001 are configured to assist in execution of computer readable instructions. Computer system 1000 may provide functionality for the components depicted in FIG. 10 as a result of the processor(s) 1001 executing non-transitory, processor-executable instructions embodied in one or more tangible computer-readable storage media, such as memory 1003, storage 1008, storage devices 1035, and/or storage medium 1036. The computer-readable media may store software that implements particular embodiments, and processor(s) 1001 may execute the software. Memory 1003 may read the software from one or more other computer-readable media (such as mass storage device(s) 1035, 1036) or from one or more other sources through a suitable interface, such as network interface 1020. The software may cause processor(s) 1001 to carry out one or more processes or one or more steps of one or more processes described or illustrated herein. Carrying out such processes or steps may include defining data structures stored in memory 1003 and modifying the data structures as directed by the software.

The memory 1003 may include various components (e.g., machine readable media) including, but not limited to, a random-access memory component (e.g., RAM 1004) (e.g., static RAM (SRAM), dynamic RAM (DRAM), ferroelectric random-access memory (FRAM), phase-change random access memory (PRAM), etc.), a read-only memory component (e.g., ROM 1005), and any combinations thereof. ROM 1005 may act to communicate data and instructions unidirectionally to processor(s) 1001, and RAM 1004 may act to communicate data and instructions bidirectionally with processor(s) 1001. ROM 1005 and RAM 1004 may include any suitable tangible computer-readable media described below. In one example, a basic input/output system 1006 (BIOS), including basic routines that help to transfer information between elements within computer system 1000, such as during start-up, may be stored in the memory 1003.

Fixed storage 1008 is connected bidirectionally to processor(s) 1001, optionally through storage control unit 1007. Fixed storage 1008 provides additional data storage capacity and may also include any suitable tangible computer-readable media described herein. Storage 1008 may be used to store operating system 1009, executable(s) 1010, data 1011, applications 1012 (application programs), and the like. Storage 1008 can also include an optical disk drive, a solid-state memory device (e.g., flash-based systems), or a combination of any of the above. Information in storage 1008 may, in appropriate cases, be incorporated as virtual memory in memory 1003.

In one example, storage device(s) 1035 may be removably interfaced with computer system 1000 (e.g., via an external port connector (not shown)) via a storage device interface 1025. Particularly, storage device(s) 1035 and an associated machine-readable medium may provide non-volatile and/or volatile storage of machine-readable instructions, data structures, program modules, and/or other data for the computer system 1000. In one example, software may reside, completely or partially, within a machine-readable medium on storage device(s) 1035. In another example, software may reside, completely or partially, within processor(s) 1001.

Bus 1040 connects a wide variety of subsystems. Herein, reference to a bus may encompass one or more digital signal lines serving a common function, where appropriate. Bus 1040 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 1000 may also include an input device 1033. In one example, a user of computer system 1000 may enter commands and/or other information into computer system 1000 via input device(s) 1033. Examples of an input device(s) 1033 include, but are not limited to, an alpha-numeric input device (e.g., a keyboard), a pointing device (e.g., a mouse or touchpad), a touchpad, a touch screen, a multi-touch screen, a joystick, a stylus, a gamepad, an audio input device (e.g., a microphone, a voice response system, etc.), an optical scanner, a video or still image capture device (e.g., a camera), and any combinations thereof. In some embodiments, the input device is a Kinect, Leap Motion, or the like. Input device(s) 1033 may be interfaced to bus 1040 via any of a variety of input interfaces 1023 (e.g., input interface 1023) including, but not limited to, serial, parallel, game port, USB, FIREWIRE, THUNDERBOLT, or any combination of the above.

In particular embodiments, when computer system 1000 is connected to network 1030, computer system 1000 may communicate with other devices, specifically mobile devices and enterprise systems, distributed computing systems, cloud storage systems, cloud computing systems, and the like, connected to network 1030. Communications to and from computer system 1000 may be sent through network interface 1020. For example, network interface 1020 may receive incoming communications (such as requests or responses from other devices) in the form of one or more packets (such as Internet Protocol (IP) packets) from network 1030, and computer system 1000 may store the incoming communications in memory 1003 for processing. Computer system 1000 may similarly store outgoing communications (such as requests or responses to other devices) in the form of one or more packets in memory 1003 and communicated to network 1030 from network interface 1020. Processor(s) 1001 may access these communication packets stored in memory 1003 for processing.

Examples of the network interface 1020 include, but are not limited to, a network interface card, a modem, and any combination thereof. Examples of a network 1030 or network segment 1030 include, but are not limited to, a distributed computing system, a cloud computing system, a wide area network (WAN) (e.g., the Internet, an enterprise network), a local area network (LAN) (e.g., a network associated with an office, a building, a campus or other relatively small geographic space), a telephone network, a direct connection between two computing devices, a peer-to-peer network, and any combinations thereof. A network, such as network 1030, may employ a wired and/or a wireless mode of communication. In general, any network topology may be used.

Information and data can be displayed through a display 1032. Examples of a display 1032 include, but are not limited to, a cathode ray tube (CRT), a liquid crystal display (LCD), a thin film transistor liquid crystal display (TFT-LCD), an organic liquid crystal display (OLED) such as a passive-matrix OLED (PMOLED) or active-matrix OLED (AMOLED) display, a plasma display, and any combinations thereof. The display 1032 can interface to the processor(s) 1001, memory 1003, and fixed storage 1008, as well as other devices, such as input device(s) 1033, via the bus 1040. The display 1032 is linked to the bus 1040 via a video interface 1022, and transport of data between the display 1032 and the bus 1040 can be controlled via the graphics control 1021. In some embodiments, the display is a video projector. In some embodiments, the display is a head-mounted display (HMD) such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In addition to a display 1032, computer system 1000 may include one or more other peripheral output devices 1034 including, but not limited to, an audio speaker, a printer, a storage device, and any combinations thereof. Such peripheral output devices may be connected to the bus 1040 via an output interface 1024. Examples of an output interface 1024 include, but are not limited to, a serial port, a parallel connection, a USB port, a FIREWIRE port, a THUNDERBOLT port, and any combinations thereof.

In addition, or as an alternative, computer system 1000 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, suitable computing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will also recognize that select televisions, video players, and digital music players with optional computer network connectivity are suitable for use in the system described herein. Suitable tablet computers, in various embodiments, include those with booklet, slate, and convertible configurations, known to those of skill in the art.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smartphone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo Wii U®, and Ouya®.

Non-Transitory Computer Readable Storage Medium

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable by one or more processor(s) of the computing device's CPU, written to perform a specified task. Computer readable instructions may be implemented as program modules, such as functions, objects, Application Programming Interfaces (APIs), computing data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or extensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® ActionScript, JavaScript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Figure 11:
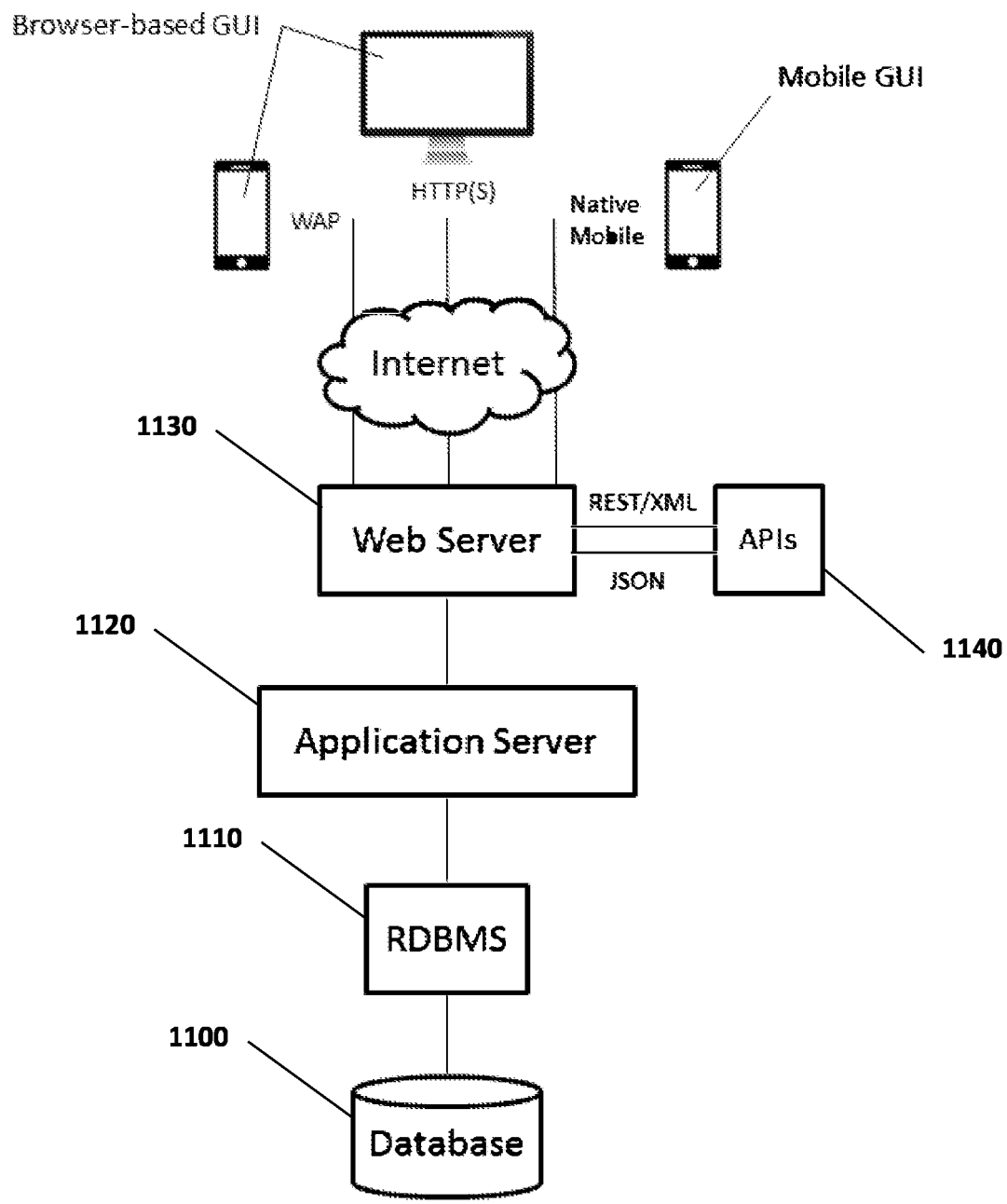
FIG. 11 shows an example of an application provision system.

Referring to FIG. 11, in a particular embodiment, an application provision system comprises one or more databases 1100 accessed by a relational database management system (RDBMS) 1110. Suitable RDBMSs include Firebird, MySQL, PostgreSQL, SQLite, Oracle Database, Microsoft SQL Server, IBM DB2, IBM Informix, SAP Sybase, SAP Sybase, Teradata, and the like. In this embodiment, the application provision system further comprises one or more application severs 1120 (such as Java servers, .NET servers, PHP servers, and the like) and one or more web servers 1130 (such as Apache, IIS, GWS and the like). The web server(s) optionally expose one or more web services via app application programming interfaces (APIs) 1140. Via a network, such as the Internet, the system provides browser-based and/or mobile native user interfaces.

Figure 12:
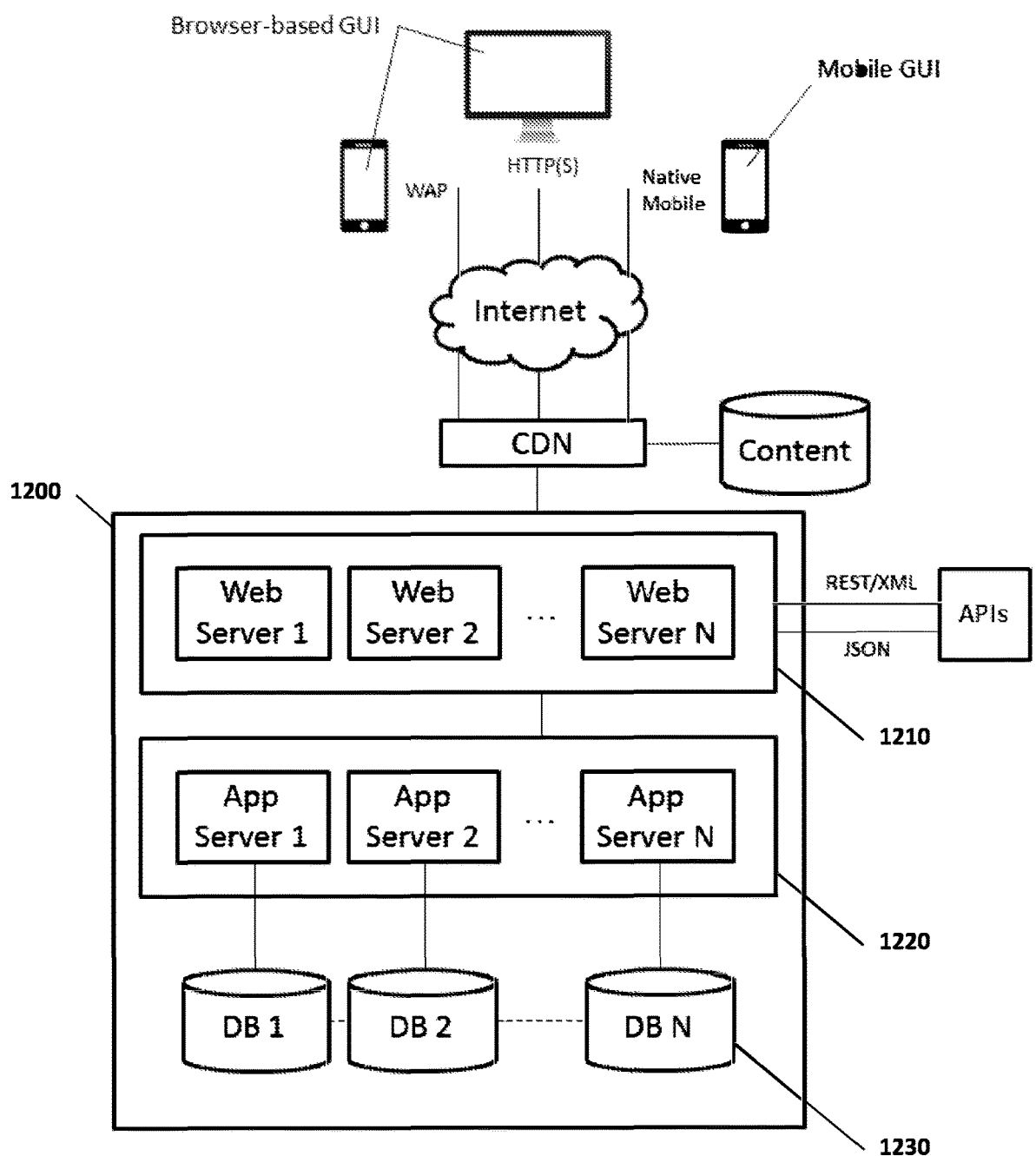
FIG. 12 shows an application provision system having a distributed, cloud-based architecture.

Referring to FIG. 12, in a particular embodiment, an application provision system alternatively has a distributed, cloud-based architecture 1200 and comprises elastically load balanced, auto-scaling web server resources 1210 and application server resources 1220 as well synchronously replicated databases 1230.

In some embodiments, one or more systems or components of the present disclosure are implemented as a containerized application (e.g., application container or service containers). The application container provides tooling for applications and batch processing such as web servers with Python or Ruby, JVMs, or even Hadoop or HPC tooling. Application containers are what developers are trying to move into production or onto a cluster to meet the needs of the business. Methods and systems of the invention will be described with reference to embodiments where container-based virtualization (containers) is used. The methods and systems can be implemented in application provided by any type of systems (e.g., containerized application, unikernel adapted application, operating-system-level virtualization or machine level virtualization).

Mobile Application

In some embodiments, a computer program includes a mobile application provided to a mobile computing device. In some embodiments, the mobile application is provided to a mobile computing device at the time it is manufactured. In other embodiments, the mobile application is provided to a mobile computing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB.NET, or combinations thereof. Compilation is often performed, at least in part, to create an executable program. In some embodiments, a computer program includes one or more executable complied applications.

Web Browser Plug-In

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB.NET, or combinations thereof.

Web browsers (also called Internet browsers) are software applications, designed for use with network-connected computing devices, for retrieving, presenting, and traversing information resources on the World Wide Web. Suitable web browsers include, by way of non-limiting examples, Microsoft® Internet Explorer®, Mozilla Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile computing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla Firefox® for mobile, Microsoft Internet Explorer® Mobile, Amazon® Kindle® Basic Web, Nokia® Browser, Opera Software® Opera® Mobile, and Sony® PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on a distributed computing platform such as a cloud computing platform. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of data pertaining to locations, cameras, videos, thresholds, events, users, classifications, objects, and the like. In various embodiments, suitable databases include, by way of non-limiting examples, relational databases, non-relational databases, object-oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In a particular embodiment, a database is a distributed database. In other embodiments, a database is based on one or more local computer storage devices.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

EXAMPLES

The following illustrative examples are representative of embodiments of the software applications, systems, and methods described herein and are not meant to be limiting in any way.

Example 1—Multi-Stage Hierarchical Computer Vision Models, Each Configured for Identification of Individuals and their Characteristics In one example, a resident had an attempted burglary at their home. To protect the home, the resident installs a video camera and deploys the local video recorder of the system herein to monitor burglary attempts. For the first three days, the local video recorder applies an edge computer vision algorithm to the video cameras stream and does not detect an object. On the fourth day, an object is detected. The local video recorder then determines that the object has an area of about 150 in$^2$, which is above the 50 in$^2$ threshold, records the video stream to the memory and upload the recorded video to the one or more back-end applications. The local video recorder then applies or more of the plurality of multi-stage hierarchical computer vision models to identify that the object is a human, that the object is a male human, that the object is an adult human male, and that the adult human male was wearing a red shirt.

Example 2—Multi-Stage Hierarchical Computer Vision Models, Each Configured for Identification of Vehicles and their Characteristics In one example, a local library has been terrorized by vandals and decides to monitor its premises at night. The library installs a video camera and deploys the local video recorder of the system herein to monitor the arrival of cars past 10:00 pm. For the first five days, the local video recorder applies an edge computer vision algorithm to the video cameras stream and does not detect an object. On the sixth day, an object is detected. The local video recorder then determines that the object has an area of about 2,700 in$^2$, which is above the 1,500 in$^2$ threshold, records the video stream to the memory and upload the recorded video to the one or more back-end applications. The local video recorder then applies or more of the plurality of multi-stage hierarchical computer vision models to identify that the object is a sedan, that the sedan is a DeLorean, a 2015-year model DeLorean, and that the license plate is "OUTATIME." With no vandalism found, the library continues their detection.

While preferred embodiments of the present subject matter have been shown and described herein, it will be obvious to those skilled in the art that such embodiments are provided by way of example only. Numerous variations, changes, and substitutions will now occur to those skilled in the art without departing from the present subject matter. It should be understood that various alternatives to the embodiments of the present subject matter described herein may be employed in practicing the present subject matter.

What is claimed is:

1. A networked video surveillance platform comprising: at least one video camera; a local video recorder; and one or more back-end applications;
   the at least one video camera deployed at a user site on a quarantined sub-network and configured to provide a video stream directly to the local video recorder;
   the local video recorder deployed at the user site, comprising a memory, and configured to perform operations comprising:
   a) provide the video stream to one or more of the back-end applications as a continuous live stream upon request generated at an interface;
   b) apply an edge computer vision algorithm to detect an object in the video stream and determine an area of the object; and
   c) when the edge computer vision algorithm detects and determines an area of the object above a threshold area, record the video stream to the memory to the memory and upload the recorded video to one or more of the back-end applications;
   the one or more back-end applications running remotely from the user site, in communication with the local video recorder by a secure network connection, and configured to perform operations comprising:
   a) maintain a data store comprising a plurality of multi-stage hierarchical computer vision models, each vision model configured for identification of a class of objects;
   b) apply one or more of the multi-stage hierarchical computer vision models to the uploaded recorded video to tag the video with one or more identified classes of objects; and
   c) provide the interface configured to:
      i) allow a user of the user site to request a continuous live stream from the local video recorder; and
      ii) allow the user to view uploaded recorded video and sort or filter the video by one or more tags corresponding to identified classes of objects.

2. The platform of claim 1, wherein the quarantined sub-network prevents the at least one video camera from allowing inbound connections, apart from receiving requests from the local video recorder for the video stream, and making outbound connections, apart from providing the video stream to the local video recorder.

3. The platform of claim 1, wherein the local video recorder is configured to time-shift the upload of the recorded video to one or more of the back-end applications to improve network performance.

4. The platform of claim 1, wherein the at least one video camera comprises a memory configured to store a recording of the video stream.

5. The platform of claim 4, wherein the at least one video camera is configured to time-shift provision of the recorded video to the local video recorder to improve network performance.

6. The platform of claim 1, wherein the at least one video camera comprises at least 5, at least 10, at least 50, or at least 100 video cameras.

7. The platform of claim 1, wherein the one or more back-end applications comprises a cloud application running on a cloud computing infrastructure.

8. The platform of claim 1, wherein one or more of the plurality of multi-stage hierarchical computer vision models utilizes a neural network.

9. The platform of claim 8, wherein the neural network comprises a convolutional neural network.

10. The platform of claim 1, wherein one or more of the plurality of multi-stage hierarchical computer vision models comprises a Region-Based Convolutional Neural Network (R-CNN) model or a You Only Look Once (YOLO) model.

11. The platform of claim 1, wherein one or more of the plurality of multi-stage hierarchical computer vision models comprises a branching algorithm.

12. The platform of claim 1, wherein one or more of the plurality of multi-stage hierarchical computer vision models performs operations comprising:
  a) analyzing an uploaded recorded video to identify a first class of object;
  b) when the first class of object is identified, analyzing the uploaded recorded video to identify a first sub-class of object; and
  c) when the first sub-class of object is identified, analyzing the uploaded recorded video to identify a second sub-class of object.

13. The platform of claim 1, wherein the secure network connection prevents the one or more back-end applications from allowing inbound connections, apart from receiving user requests from the interface and recorded video uploads from the local video recorder.

14. The platform of claim 1, wherein the local video recorder is further configured to apply one or more of the multi-stage hierarchical computer vision models to the video stream to tag the video with one or more identified classes of objects.

15. The platform of claim 1, wherein the video stream is stored in the memory of the local video recorder as a plurality of discrete files.

16. The platform of claim 15, wherein each discrete file includes 5, 10, 15, or 20 seconds of video.

17. A method for performing networked video surveillance comprising:
  a) receiving, at a local video recorder deployed at a user site, a video stream generated by at least one video camera deployed at the user site on a quarantined sub-network;
  b) providing, by the local video recorder, the video stream to one or more back-end applications as a continuous live stream in response to a request generated at an interface;
  c) applying, by the local video recorder, an edge computer vision algorithm to detect an object in the video stream and determine an area of the object;
    when the edge computer vision algorithm detects and determines an area of the object above a threshold area:
      i) recording the video stream to a memory of the local video recorder, and
      ii) uploading the recorded video to the one or more back-end applications;
  d) maintaining, by one or more back-end applications implemented remotely from the user site and in communication with the local video recorder by a secure network connection, a data store comprising a plurality of multi-stage hierarchical computer vision models, each vision model configured for identification of a class of objects;
  e) applying, by the one or more back-end applications, one or more of the multi-stage hierarchical computer vision models to the uploaded recorded video to tag the video with one or more identified classes of objects; and
  f) providing, by the one or more back-end applications, an interface configured to:
    i) allow a user of the user site to request a continuous live stream from the local video recorder, and
    ii) allow the user to view uploaded recorded video and sort or filter the video by one or more tags corresponding to identified classes of objects.

18. The method of claim 17, wherein the quarantined sub-network prevents the at least one video camera from allowing inbound connections, apart from receiving requests from the local video recorder for the video stream, and making outbound connections, apart from providing the video stream to the local video recorder.

19. The method of claim 17, wherein the method comprises time-shifting, by the local video recorder, the upload of the recorded video to one or more of the back-end applications to improve network performance.

20. The method of claim 17, wherein the at least one video camera comprises a memory configured to store a recording of the video stream.

21. The method of claim 20, wherein the method comprises time-shifting, by the at least one video camera, provision of the recorded video to the local video recorder to improve network performance.

22. The method of claim 17, wherein the at least one video camera comprises at least 5, at least 10, at least 50, or at least 100 video cameras.

23. The method of claim 17, wherein the one or more back-end applications comprises a cloud application running on a cloud computing infrastructure.

24. The method of claim 17, wherein one or more of the plurality of multi-stage hierarchical computer vision models utilizes a neural network.

25. The method of claim 24, wherein the neural network comprises a convolutional neural network.

26. The method of claim 17, wherein one or more of the plurality of multi-stage hierarchical computer vision models comprises a Region-Based Convolutional Neural Network (R-CNN) model or a You Only Look Once (YOLO) model.

27. The method of claim 17, wherein one or more of the plurality of multi-stage hierarchical computer vision models comprises a branching algorithm.

28. The method of claim 17, wherein applying the one or more of the multi-stage hierarchical computer vision models further comprises:
  a) analyzing an uploaded recorded video to identify a first class of object;
  b) when the first class of object is identified, analyzing the uploaded recorded video to identify a first sub-class of object; and
  c) when the first sub-class of object is identified, analyzing the uploaded recorded video to identify a second sub-class of object.

29. The method of claim 17, wherein the secure network connection prevents the one or more back-end applications from allowing inbound connections, apart from receiving user requests from the interface and recorded video uploads from the local video recorder.

30. The method of claim 17, wherein the method comprises applying, by the local video recorder, one or more of the multi-stage hierarchical computer vision models to the video stream to tag the video with one or more identified classes of objects.

31. The method of claim 17, wherein the video stream is stored in the memory of the local video recorder as a plurality of discrete files.

32. The method of claim 31, wherein each discrete file includes 5, 10, 15, or 20 seconds of video.

* * * * *